US010641177B2

(12) United States Patent
Brostmeyer et al.

(10) Patent No.: US 10,641,177 B2
(45) Date of Patent: May 5, 2020

(54) APPARATUS AND PROCESS OF RETROFITTING A COMBINED CYCLE POWER PLANT

(71) Applicant: Florida Turbine Technologies, Inc., Jupiter, FL (US)

(72) Inventors: Joseph D. Brostmeyer, Jupiter, FL (US); Russell B. Jones, North Palm Beach, FL (US); Justin T. Cejka, Palm Beach Gardens, FL (US); John A. Orosa, Palm Beach Gardens, FL (US); John E. Ryznic, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 300 days.

(21) Appl. No.: 15/549,050

(22) PCT Filed: Mar. 23, 2016

(86) PCT No.: PCT/US2016/023764
§ 371 (c)(1),
(2) Date: Aug. 4, 2017

(87) PCT Pub. No.: WO2016/127187
PCT Pub. Date: Aug. 11, 2016

(65) Prior Publication Data
US 2018/0066586 A1 Mar. 8, 2018

Related U.S. Application Data

(60) Provisional application No. 62/112,696, filed on Feb. 6, 2015.

(51) Int. Cl.
*F02C 3/06* (2006.01)
*F02C 7/18* (2006.01)
(Continued)

(52) U.S. Cl.
CPC .............. *F02C 7/185* (2013.01); *F01D 9/041* (2013.01); *F01D 25/08* (2013.01); *F01D 25/12* (2013.01);
(Continued)

(58) Field of Classification Search
CPC ...... F02C 3/06; F02C 6/00; F02C 6/02; F02C 6/18; F02C 7/36; F05D 2230/80
See application file for complete search history.

(56) References Cited

U.S. PATENT DOCUMENTS 6,161,374 A * 12/2000 Sverdlin ................ B63H 21/16
60/39.15
6,321,539 B1 * 11/2001 Bronicki ............... F01K 23/067
60/641.8
(Continued)

FOREIGN PATENT DOCUMENTS

JP           20149606 A      1/2014
WO        2012040790 A1    4/2012

OTHER PUBLICATIONS

International Search Report and Written Opinion dated Sep. 13, 2016, for corresponding International Application No. PCTS/US2016/023764; International Filing Date: Mar. 23, 2016 consisting of 13-pages.
(Continued)

*Primary Examiner* — Steven M Sutherland
(74) *Attorney, Agent, or Firm* — Christopher & Weisberg, P.A.

(57) ABSTRACT

A process for retrofitting an electric power plant that uses two 60 Hertz large frame heavy duty industrial gas turbine engines to drive electric generators and produce electricity, where each of the two industrial engines can produce up to 350 MW of output power. The process replaces the two 350 MW industrial engines with one twin spool industrial gas turbine engine that is capable of producing at least 700 MW
(Continued)

of output power. Thus, two prior art industrial engines can be replaced with one industrial engine that can produce power equal to the two prior art industrial engines.

7 Claims, 20 Drawing Sheets

(51) Int. Cl.
    *F02C 6/18*     (2006.01)
    *F01K 23/10*     (2006.01)
    *F01D 25/08*     (2006.01)
    *F02C 3/13*     (2006.01)
    *F02C 6/08*     (2006.01)
    *F01D 9/04*     (2006.01)
    *F01D 25/12*     (2006.01)

(52) U.S. Cl.
    CPC ............... *F01K 23/10* (2013.01); *F02C 3/06* (2013.01); *F02C 3/13* (2013.01); *F02C 6/08* (2013.01); *F02C 6/18* (2013.01); *F05D 2220/32* (2013.01); *F05D 2220/76* (2013.01); *F05D 2230/80* (2013.01); *F05D 2260/211* (2013.01); *Y02E 20/16* (2013.01); *Y02T 50/675* (2013.01)

(56) References Cited

U.S. PATENT DOCUMENTS

| | | | | |
|---|---|---|---|---|
| 6,608,395 | B1* | 8/2003 | Steinway | F01D 13/00 290/40 A |
| 2006/0248896 | A1* | 11/2006 | Hansson | F01K 21/047 60/774 |
| 2008/0000237 | A1* | 1/2008 | Briesch | F02C 6/00 60/772 |
| 2008/0314046 | A1* | 12/2008 | Gugliotta | F01D 21/00 60/783 |
| 2011/0289930 | A1* | 12/2011 | Draper | F02C 3/34 60/772 |
| 2012/0186070 | A1* | 7/2012 | Dalessandro | F01D 15/10 29/592.1 |

OTHER PUBLICATIONS

Sebastian Teir, et al. "Thermal Design of Heat Exchangers," Jan. 1, 2002, XP055287150.

V. Ganapathy, "Heat-Reovery Steam Generators: Understand the Basics," Aug. 1, 1996, XP055287151.

Office Action dated Oct. 18, 2019 for corresponding Indian Application No. 201737028702 filed on Aug. 11, 2017, consisting of 6-pages.

Ganapathy, "Heat-Recovery Steam Generators: Understand the Basics," Chemical Engineering Progress, 1996; consisting of 14-pages.

Teir et al, "Thermal Design of Heat Exchangers," Helsinki University of Technology Department of Mechanical Engineering, Energy Engineering and Environmental Protection Publications, Steam Boiler Technology eBook, 2002; consisting of 24-pages.

* cited by examiner

APPARATUS AND PROCESS OF RETROFITTING A COMBINED CYCLE POWER PLANT

CROSS-REFERENCE TO RELATED APPLICATIONS

This application is a Submission under 35 U.S.C. § 371 for U.S. National Stage Patent Application of International Application Number PCT/US2016/023764, filed Mar. 23, 2016, entitled APPARATUS AND PROCESS OF RETROFITTING A COMBINED CYCLE POWER PLANT, which claims priority to U.S. Provisional Application No. 62/112,696, filed Feb. 6, 2015, the entirety of both of which are incorporated herein by reference.

GOVERNMENT LICENSE RIGHTS

This invention was made with Government support under contract number DE-FE0023975 awarded by Department of Energy. The Government has certain rights in the invention.

TECHNICAL FIELD

The present invention relates generally to an industrial gas turbine engine, and more specifically to an apparatus and a process for retrofitting a combined cycle power plant by replacing two older gas turbine engines with one new gas turbine engine that has more power output and substantially the same turbine exhaust temperature.

BACKGROUND

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

In an industrial gas turbine engine used for electrical power production, during periods of low electrical demand the engine is reduced in power. During periods of low electrical power demand, prior art power plants have a low power mode of 40% to 50% of peak load. At these low power modes, the engine efficiency is very low and thus the cost of electricity is higher than when the engine operates at full speed with the higher efficiency.

Industrial and marine gas turbine engines used today are shown in FIGS. 12-15. These designs suffer from several major issues that include low component (compressor and turbine) performance for high cycle pressure ratios or low part load component efficiencies or high CO (carbon monoxide) emissions at part load when equipped with low NOx combustors which limit the low power limit at which they are allowed to operate (referred to as the turn-down ratio).

FIG. 12 shows a single shaft IGT engine with a compressor 1 connected to a turbine 2 with a direct drive electric generator 3 on the compressor end. FIG. 13 shows a dual shaft IGT engine with a high spool shaft and a separate power turbine 4 that directly drives an electric generator 3. FIG. 14 shows a dual shaft aero derivative gas turbine engine with concentric spools in which a high pressure spool rotates around the low pressure spool, and where a separate low pressure shaft that directly drives an electric generator 3. FIG. 15 shows a three-shaft IGT engine with a low pressure spool rotating within a high pressure spool, and a separate power turbine 4 that directly drives an electric generator 3.

The configuration of FIG. 12 IGT engine is the most common for electric power generation and is limited by non-optimal shaft speeds for achieving high component efficiencies at high pressure ratios. The mass flow inlet and exit capacities are limited structurally by $AN^2$ (last stage blade stress) and tip speeds that limit inlet and exit diameters due to high tip speed induced Mach number losses in the flow. Therefore for a given rotor speed, there is a maximum inlet diameter and corresponding flow capacity for the compressor and exit diameter and flow capacity for the turbine before the compressor and turbine component efficiencies start to drop off due to high Mach number losses.

Since there is a fixed maximum inlet flow at high pressure ratios on a single shaft, the rotor blades start to get very small in the high pressure region of the compressor flow path. The small blade height at a relatively high radius gives high losses due to clearance and leakage affects. High pressure ratio aircraft engines overcome this limitation by introduction of separate high pressure and low pressure shafts. The high pressure shaft turns at a faster speed allowing for smaller radius while still accomplishing a reasonable work per stage. An example for this is shown in FIG. 14, which is typical of an aero-derivative gas turbine engine used for electrical power production. The speed of the high pressure spool 5 is still limited by having a low speed shaft 6 inside the inner diameter (ID) of the high pressure shaft 5. This drives the high pressure shaft 5 flow path to a higher radius relative to what might otherwise be feasible, which thereby reduces the speed of the high pressure rotor, creating smaller radius blades which reduce the efficiency of the high pressure spool. FIG. 13 arrangement is similarly limited in achieving high component efficiencies at high pressure ratios as FIG. 12 since the entire compressor is on one shaft.

Turn down ratio is the ratio of the lowest power load at which a gas turbine engine can operate (and still achieve CO emissions below the pollution limit) divided by the full 100% load power. Today's gas turbines have a turn down ratio of around 40%. Some may be able to achieve 30%. Low part load operation requires a combination of low combustor exit temperatures and low inlet mass flows. Low CO emissions require a high enough combustor temperature to complete the combustion process. Since combustion temperature must be maintained to control CO emissions, the best way to reduce power is to reduce the inlet mass flow. Typical single shaft gas turbine engines use multiple stages of compressor variable guide vanes to reduced inlet mass flow. The limit for the compressor flow reduction is around 50% for single shaft constant rotor speed compressors as in FIG. 12. The FIG. 14 arrangement is similarly limited as the FIG. 12 arrangement in flow inlet mass flow reduction since the low pressure compressor runs at the constant speed of the generator. In industrial engine that drive electric generators, the turbine that drives the electric generator is set to operate at a constant speed such as 3,600 rpm for a 60 hertz engine in the USA or at 3,000 rpm for a 50 hertz engine in European countries.

The FIG. 15 arrangement is the most efficient option of the current configurations for IGT engines, but is not optimal because the low spool shaft 6 rotates within the high spool shaft 5, and thus a further reduction in the high spool radius cannot be achieved. In addition, if the speed of the low spool shaft 6 is reduced to reduce inlet mass flow, there is a mismatch of angle entering the LPT (Low Pressure Turbine) from the HPT (High Pressure Turbine) and mismatch of the flow angle exiting the LPT and entering the PT (Power Turbine) leading to inefficient turbine performance at part load.

FIG. 16 shows a prior art electric power plant that uses two prior art industrial gas turbine engines 111 that each drive an electric generator 112. In the prior art technology of today, each of these industrial engines 111 can produce up to 350 MW of output for a 60 hertz engine and up to 500 MW for a 50 hertz engine. When these prior art industrial engines 11 are to be replaced with new engines, two new industrial engines of equal power are required. When a new industrial gas turbine engine replaces an older industrial gas turbine engine in a combined cycle power plant, the turbine exhaust temperature of the new engine must be substantially the same as the turbine exhaust temperature of the older engine because the HRSG (Heat Recovery Steam Generator) of the combined cycle power plant would require significant structural changes to allow for the higher exhaust temperature. For example, two older IGT engines of 180 MW power could be replaced with a new IGT engine that produces 350 MW power but the turbine exhaust temperature of the newer engine would be must higher than in the older engines and thus would require a significant change to the HRSG system to be capable of handling the higher turbine exhaust temperature. In another example, two of the 300 MW IGT engines could not be replaced with a single new IGT engine because the new engine would have to produce 600 MW which does not exist at the present time.

SUMMARY

An industrial gas turbine engine of the type used for electrical power production with a high pressure spool and a low pressure spool in which the two spools can be operated independently so that a turn-down ratio of as little as 12% can be achieved while still maintaining high efficiencies for the engine. An electric generator is connected directly to the high pressure spool and operates at a continuous and constant speed. The low pressure spool is driven by turbine exhaust from the high pressure spool and includes variable inlet guide vanes in order to regulate the speed of the low pressure spool. Compressed air from the low pressure spool is supplied to an inlet of the compressor of the high pressure spool. An interstage cooler can be used to decrease the temperature of the compressed air passed to the high pressure spool.

The twin spool IGT engine with separately operable spools can maintain high component efficiencies of the compressor and turbine at high pressure ratios of 40 to 55, which allow for increased turbine inlet temperatures while keeping the exhaust temperature within today's limits.

The turbine exhaust from both spools can be directed into a HRSG (heat recovery steam generator) to produce steam that is used to power a steam turbine that drives an electric generator to further increase the overall efficiency of the power plant.

In another embodiment, a fraction of the compressed air from the low pressure compressor is extracted and further compressed by a boost compressor and then delivered to a cooling circuit for the high pressure turbine stator vanes, where the heated cooling air is then discharged into the combustor.

In still another embodiment of the present invention, turbine exhaust from the high pressure spool is used to drive an intermediate pressure power turbine (IPPT) that is connected by a power shaft to an external load such as an electric generator, a gearbox, a compressor, or a ship propeller. The intermediate pressure power turbine shaft passes within the low pressure spool whereby the speed of the intermediate pressure power turbine shaft can be regulated by controlling the speed of the low pressure spool and thus regulating the mass flow amount of compressed air supplied from the low spool compressor to the high spool compressor. In this embodiment, the load is not connected to the high spool but to the intermediate pressure power turbine (IPPT).

With the design of the twin spool IGT engine of the present invention, a gas turbine engine combined cycle power plant can operate with a net thermal efficiency of greater than 67%, which is a significant increase over current engine thermal efficiencies.

In addition, current IGT engines used for electrical power production are limited to power output of around 350 MW (for 60 Hertz engines) and 500 MW (for 50 Hertz engines) due to size and mass flow constraints. With the twin spool design of the present invention, existing IGT engines can be retrofitted to operate at close to double the existing maximum power output. One example is the General Electric (GE) 9HA.02 industrial engine which operates at 50 Hertz and produces a maximum output of 470 MW, or the GE industrial engine 7HA.02 for the 60 hertz market that produces a maximum output of 330 MW. The 50 hertz industrial engines can produce more power because they operate at a lower speed, and thus the rotor blades can be longer. The engine flow can thus be larger because of the larger but slower rotating blades based on the $AN^2$ limitation. With greater flow comes greater power output.

In a combined cycle power plant that uses very old IGT engines such as the 180 MW IGT engines, a new IGT engine of at least 360 MW would be required and that the turbine exhaust temperature of the new and more powerful IGT engine would be substantially the same at the turbine exhaust temperature of the two older engines in order that the HRSG itself would not have to be modified. In fact, the only adaptation of the HRSG would be the duct work channeling the hot turbine exhaust from the engine outlet to the HRSG inlet. Replacing two older engines with a single new IGT engine having twice the power would produce a much higher turbine exhaust temperature and thus would require significant modifications of the HRSG in order to accommodate this higher turbine exhaust temperature. The twin spool IGT engine of the present invention would have a similar turbine exhaust temperature of the engines it will be replacing so that no changes to the HRSG would be required. The new IGT engine could be installed to replace the two smaller IGT engines without modification of the HRSG. If the turbine exhaust temperature was too high, then significant changes to the HRSG would be required to allow for the higher temperatures. The single engine of the present invention with the twin spools can produce over 700 MW for a 60 Hertz engine and over 1,000 MW for a 50 Hertz engine.

Another benefit of the twin spool IGT engine is that a family of different sizes of prior art single spool IGT engines can be retrofitted by including the low pressure spool design of the present invention of varying size and pressure ratio that would supply compressed air to the high spool compressor.

Cooling air used to cool hot parts of a turbine is reintroduced into a combustor in which the cooling air is discharged into a diffuser located between an outlet of the compressor and an inlet of the combustor in order to energize the boundary layer within the diffuser. In one embodiment of the diffuser, cooling air from the stator vanes is discharged parallel to the compressed air flow against an outer wall of the diffuser and cooling air from the rotor blades is discharged parallel to the compressor discharge against an inner wall of the diffuser and at a velocity equal to or greater than the velocity of the compressor discharge air so that the boundary layer in the diffuser is energized.

An Industrial Gas Turbine Engine for electrical power generator includes a high spool connected directly to an electric generator and a low spool separate from the high spool so that the two spools can be operated rotatably independently of one another. Compressed air from the low spool compressor flows into the inlet to the compressor of the high spool. The high spool compressor includes an inner flow path and an outer flow path with different temperatures of flow. The inner flow path is compressed in the high spool compressor and then discharged into the combustor. The outer flow path is first cooled in an inter-cooler and then compressed in the high spool compressor, where the cooler compressed air is then passed through stator vanes in the turbine to provide cooling. The outer flow path of the high spool compressor is about 20% of the total flow through the high spool compressor. If the outer flow compressed air is not cooled, the compressed air discharged from the high spool compressor would be too hot to be used in cooling of turbine vanes.

The high spool compressor can have the cooler air flow in the outer flow path or in the inner flow path so that the cooler compressed air can be used to cool the rotor of the high spool compressor. The high spool compressor with the dual flow paths includes rotor blades with a main blade extending from the rotor and a shroud on the end of the main blade, with one or more smaller blades extending from the shroud to form the compressor airfoils for the outer and smaller flow path.

For a proposed advanced engine cycle, about 20% of the main flow must be cooled and then compressed separately to be available as cooling flow to the turbine. The addition of a second isolated flow stream in the axial HPC compressor avoids having to add significant support systems for a separate compressor. For example, a separate axial or centrifugal compressor driven by electric motor or gear-box linked to the main gas turbine would be the current known solution.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
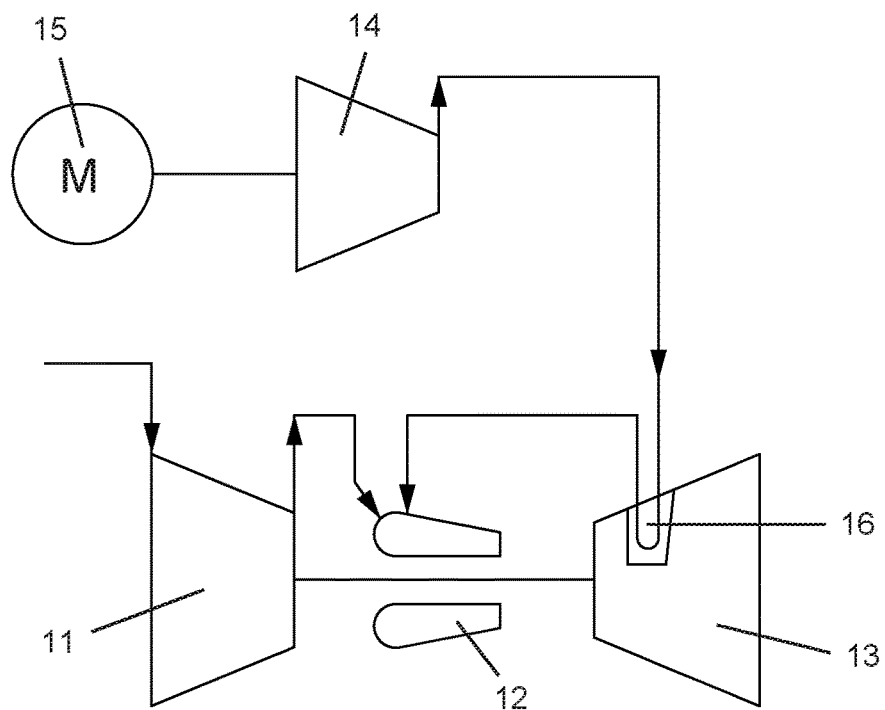
FIG. 1 shows a first embodiment of the gas turbine engine with turbine airfoil cooling of the present invention.

The present invention is a gas turbine engine with cooling of the turbine stator vanes. FIG. 1 shows a first embodiment of the present invention with a gas turbine engine having a main compressor 11, a combustor 12 and a turbine 13 in which the compressor 11 and the turbine 13 are connected together by a rotor shaft. The turbine 13 has a first stage of stator vanes 16 that are cooled. The compressor 11 compresses air that is then burned with a fuel in the combustor 12 to produce a hot gas stream that is passed through the turbine 13. A second or cooling air compressor 14 is driven by a motor 15 to compress air at a higher pressure than from the first compressor 11. The higher compressed air is then passed through the stator vanes 16 in the turbine 13 for cooling, and the heated cooling air is then passed into the combustor 12 to be combined with the fuel and the compressed air from the first or main compressor 11.

The second or cooling air compressor 14 produces high pressure compressed air for cooling of the stator vanes 16 such that it can then be discharged into the combustor 12. Without the suitable higher pressure from the cooling air compressor 14, the cooling air pressure discharged from the stator vanes would not be high enough pressure to pass into the combustor 12.

Figure 2:
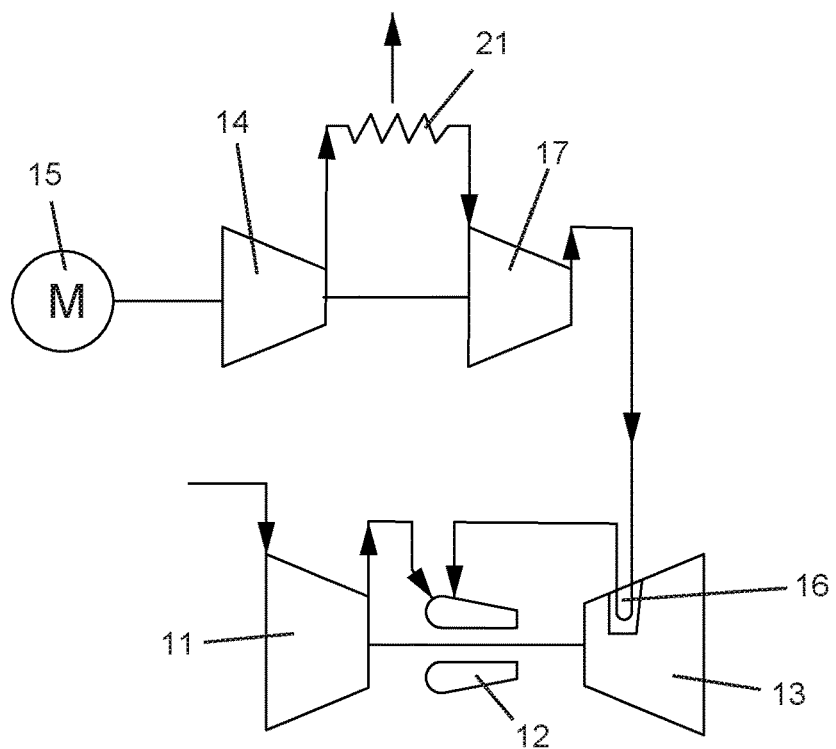
FIG. 2 shows a second embodiment of the gas turbine engine with turbine airfoil cooling with interstage cooling of the present invention.

FIG. 2 shows a second embodiment of the present invention in which a cooling air flow compression system includes a low pressure compressor (LPC) 14 and a high pressure compressor (HPC) 17 with an intercooler 21 in between to cool the compressed air from the LPC 14. The compressed air from the cooling air flow compression system (14, 17) and the intercooler 21 is then used to cool the stator vanes 16 which is then discharged into the combustor 12. The cooling air flow compression system (14, 17) with the intercooler 21 produces a higher pressure cooling air than the first compressor 11 so that enough pressure remains after cooling of the stator vanes 16 to be discharged into the combustor 12.

Figure 3:
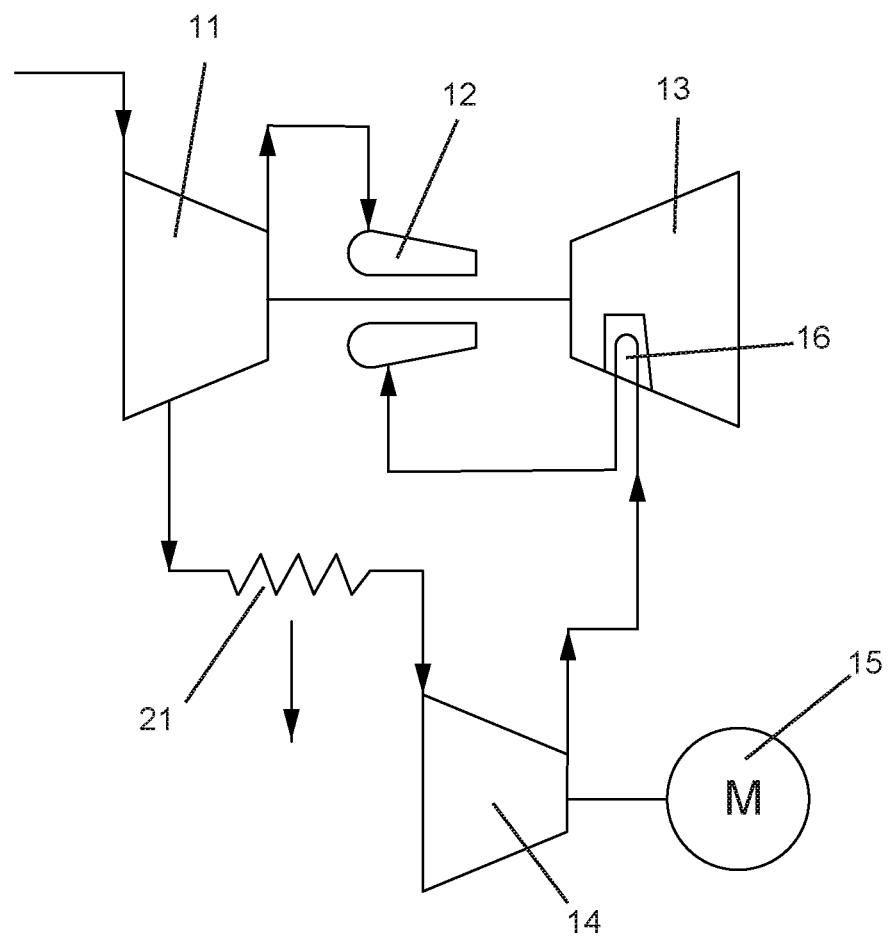
FIG. 3 shows a third embodiment of the gas turbine engine with turbine airfoil cooling with interstage cooling of the present invention.

FIG. 3 shows a third embodiment of the present invention where the cooling air for the stator vanes 16 is bled off from a later stage (after the first stage) of the main flow compressor 11, passed through an intercooler 21, and then enters a cooling air compressor 14 to be increased in pressure. The higher pressure air from the cooling air compressor 14 is then passed through the stator vanes 16 for cooling, and then discharged into the combustor 12.

In the three embodiments, the first or main flow compressor 11 provides approximately around 80% of the required air for the combustor 12. The second or cooling air compressor 14 produces the remaining 20% for the combustor 12. In one industrial gas turbine engine studied, the first or main flow compressor 11 has a pressure ratio of 30 while the second or cooling air compressor 14 has a pressure ratio of 40.

Figure 4:
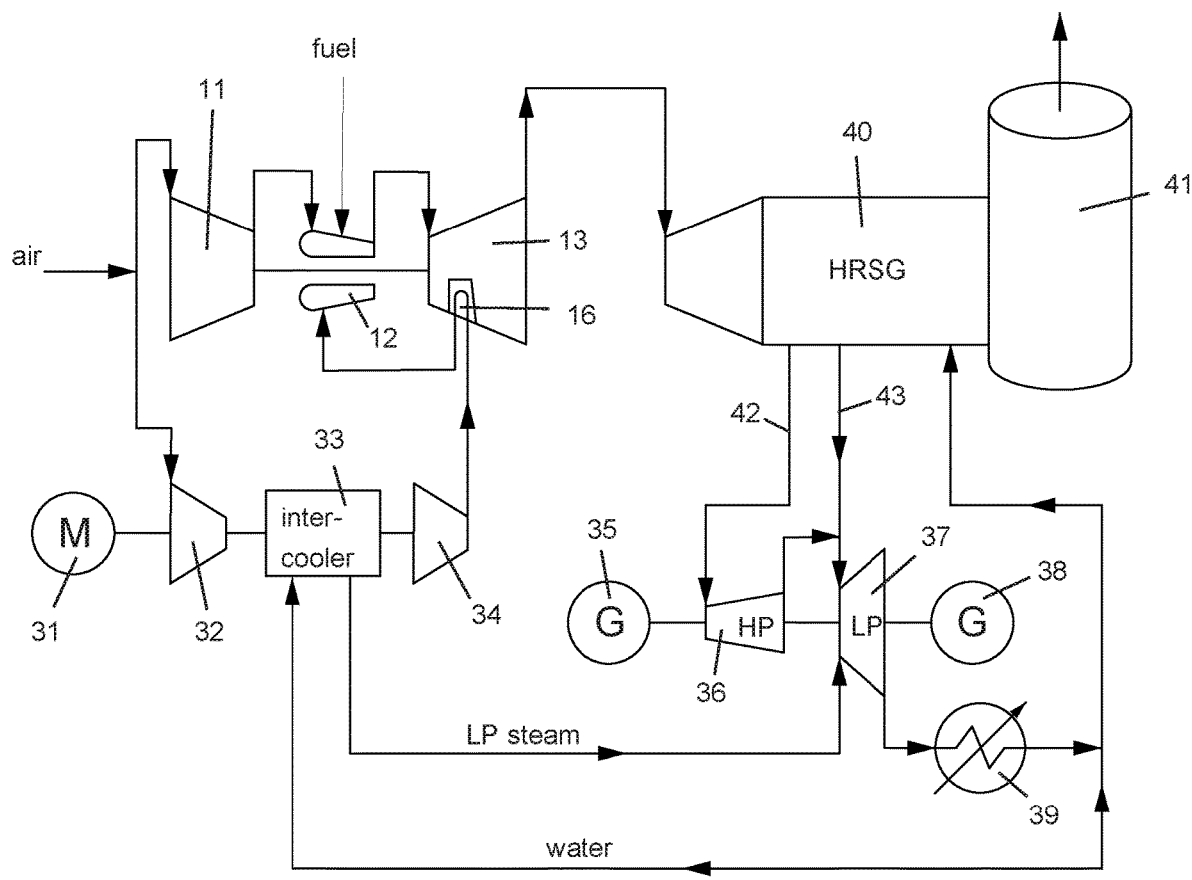
FIG. 4 shows a fourth embodiment of the gas turbine engine with turbine airfoil cooling with interstage cooling associated with a HRSG for steam production of the present invention.

FIG. 4 shows another embodiment of the present invention with turbine cooling and an intercooler heat recovery. The gas turbine engine includes a main flow compressor 11, a combustor 12, and a turbine 13 in which a turbine airfoil such as a stator vane 16 is cooled. Fuel is introduced into the combustor 12 to produce a hot gas stream that is passed through the turbine 13. Compression of the turbine cooling air flow takes place in low pressure compressor 32 and a high pressure compressor 34 with an intercooler 33 in between. An intercooler/low pressure steam generator 33 is positioned between high and low pressure compressors 32 and 34 to cool the compressed air so that more flow can be created for the combustor. A motor 31 drives both compressors 32 and 34 that compress air for use in cooling of the turbine airfoil 16.

The gas turbine 13 exhaust is used to produce steam in a Heat Recovery Steam Generator (HRSG) 40. The HRSG 40 produces high pressure (HP) steam 42 that is delivered to a high pressure turbine 36 to drive a first electric generator 35. The HRSG 40 also produces low pressure (LP) steam 43 that is combined with LP steam from the HP turbine exhaust that flows into a low pressure (LP) turbine 37 that drives a second electric generator 38. A stack 41 discharges the turbine exhaust after use in the HRSG 40. A condenser 39 condenses the steam discharged from the LP turbine 37 into water that then flows into the HRSG 40 or to the intercooler 33. Water that flows into the intercooler 33 is used to cool the compressed air discharged from the low pressure compressor 32 producing low pressure (LP) steam that then flows into the inlet of the LP turbine 37 along with the LP steam from the HRSG 40. As a result, the compressed air from the high pressure compressor 34 has a lower temperature than without the use of an intercooler and therefore the cooling of the turbine airfoil 16 is improved. The cooling air from the turbine airfoil 16 is then discharged into the combustor 12 to be burned with fuel and produce the hot gas stream for the turbine 13.

Figure 5:
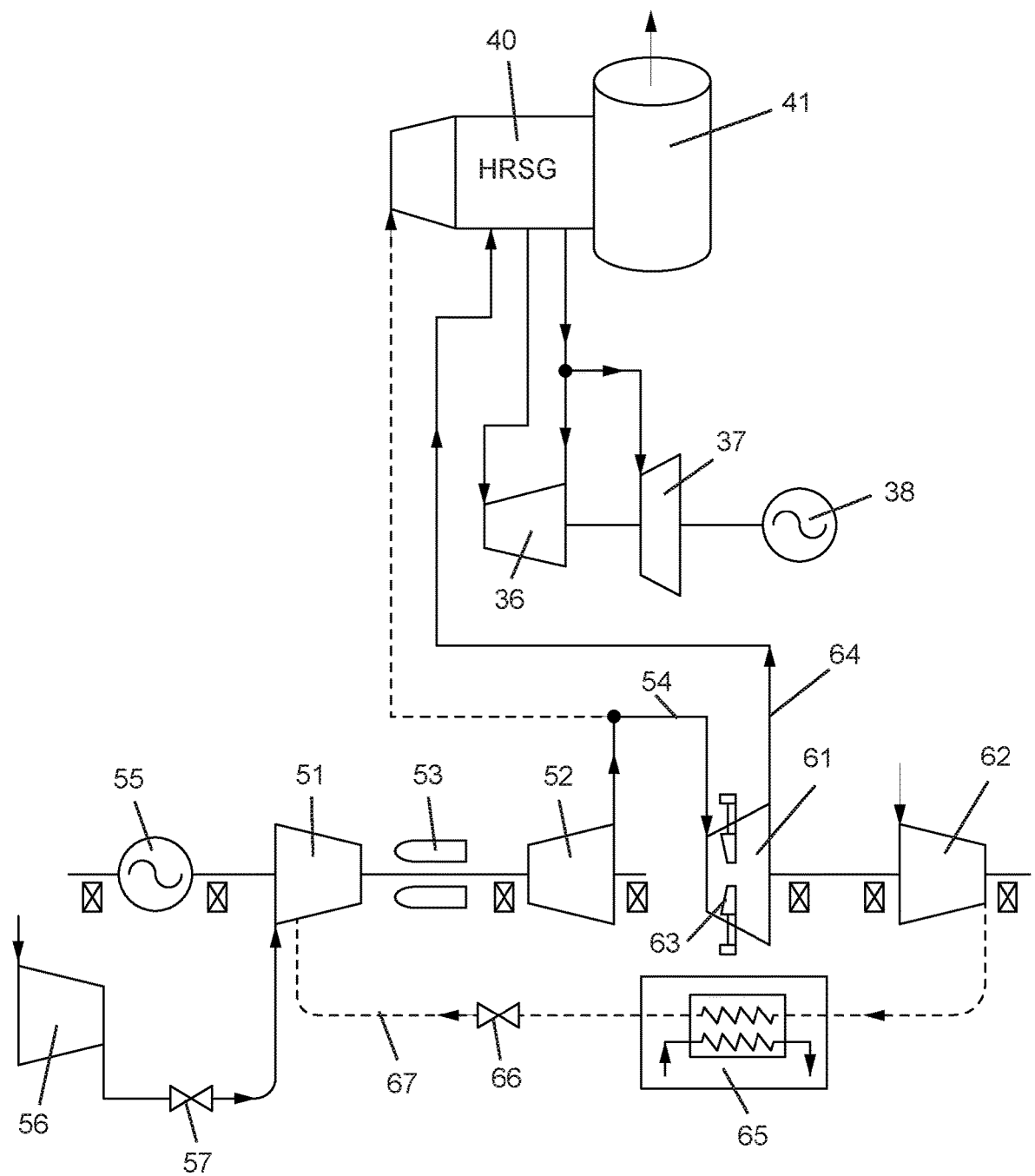
FIG. 5 shows a diagram of a power plant with a first embodiment of a mechanically uncoupled twin spool turbocharged industrial gas turbine engine of the present invention.

The embodiment of FIG. 5 is a high pressure ratio flexible industrial gas turbine engine with non-concentric spools in which the high pressure spool can be operated together or without the low pressure spool depending on the electrical power load. FIG. 5 shows the power plant to include a main gas turbine engine with a high pressure compressor 51, a combustor 53, and a high pressure gas turbine 52 connected by a rotor shaft to an electric generator 55. The main engine (51, 52, 53) and the generator 55 are rotatably supported by bearings. In an option for supply the inlet air to the high pressure compressor 51, the inlet of the main high pressure compressor 51 is connected to a boost compressor 56 through a valve 57. The high pressure compressor 51 and the high pressure turbine 52 are part of the high pressure spool.

A low pressure gas turbine 61 is connected to a low pressure compressor 62 by a rotor shaft which is supported by bearings. The low pressure compressor 62 includes an inlet guide vane and variable stator vanes 63 allowing for modulating the compressed air flow. The low pressure gas turbine 61 and low pressure compressor 62 forms a low pressure spool and is non-concentric (can operate independently) with the main engine or high pressure spool 51 and 52. Similarly, the high pressure compressor 51 can also include variable stator vanes that allow for flow matching and speed control. Thus, the low pressure spool 61 and 62 can be shut down and not be operated while the main engine or high speed spool 51 and 52 operates to drive the electric generator 55. An outlet of the low pressure compressor 62 is connected by a line 67 to an inlet of the high pressure compressor 51. An intercooler 65 can be used between the outlet of the low pressure compressor 62 and the inlet of the high pressure compressor 51 to cool the compressed air. A valve 66 can also be used in the line 67 for the compressed air from the low pressure compressor 62 to the high pressure compressor 51. FIG. 5 shows the dashed inlet to the high pressure compressor 51 at a later stage, but could be located upstream from the first stage compressor blades.

Major advantages of the twin spool turbo-charged industrial gas turbine engine of the present invention (with one embodiment shown in FIG. 5) are described here. A large frame heavy duty industrial gas turbine engine of the prior art uses only a single spool with the rotor shaft directly connected to an electric generator. This design permits a large amount of power transfer to the generator without the need for a gearbox. In large frame heavy duty industrial engine, a gear box cannot be used because the power output of the engine is far greater than a gear box can be exposed to. Due to these factors, the gas turbine must operate with a very specific rotor speed equal to the synchronization speed of the local electrical power grid. By separating the components of the gas turbine into modular systems according to the present invention, each can then be individually optimized to provide maximum performance within an integrated system. Also, substantial power output and operability improvements can be realized over the prior art industrial engines. For example, the largest 60 hertz IGT engine of the prior art can produce at most 350 MW while the 60 Hertz version of the twin spool turbo-charged industrial engine of the present invention can produce over 700 MW. The largest 50 hertz IGT engine of the prior art can produce at most 500 MW while the 50 Hertz version of the twin spool turbo-charged IGT engine of the present invention can produce over 1,000 MW of power. In both the 50 hertz and 60 hertz versions, the turbine exhaust temperature would be substantially the same as the turbine exhaust temperature of the older IGT engines being replaced such that no substantial modifications or structural changes would be required to the HRSG itself. Only the duct work channeling the turbine exhaust to the HRSG would need to be modified. In a combined cycle power plant that uses very old engines such as those with 180 MW of power, a single new engine of 360 MW of power could be used to replace these two older IGT engines but the turbine exhaust temperature of the new engine would be significantly higher than the two older engines being replaced such that significant modification or changes would be required of the HRSG to accommodate the higher turbine exhaust temperature. With the twin spool turbo-charged IGT engine of the present invention, one twin spool turbo-charged IGT engine of the present invention could be used to replace the two older 180 MW engines without significant change to the HRSG required.

The efficiency of the gas turbine is known to be largely a function of the overall pressure ratio. While existing IGTs limit the maximum compressor pressure ratio that can be achieved because optimum efficiency cannot be achieved simultaneously in the low and high pressure regions of the compressor while both are operating at the same (synchronous) speed, an arrangement that allows the low pressure and high pressure compressors to each operate at their own optimum rotor speeds will permit the current overall pressure ratio barrier to be broken. In addition, segregating the low pressure and high pressure systems is enabling for improved component efficiency and performance matching. For example, the clearance between rotating blade tips and outer static shrouds or ring segments of existing IGTs must be relatively large because of the size of the components in the low pressure system. In the present invention, the clearances in the high pressure system could be reduced to increase efficiency and performance.

The twin spool turbocharged IGT of the present invention enables a more operable system such that the engine can deliver higher efficiency at turn-down, or part power, and responsiveness of the engine can be improved. Further, this design allows for a greater level of turndown than is otherwise available from the prior art IGTs.

In yet another example, the power output and mass flow of prior art IGTs is limited by the feasible size of the last stage turbine blade. The length of the last stage turbine blade is stress-limited by the product of its swept area (A) and the square of the rotor speed (N). This is commonly referred to as the turbine $AN^2$. For a given rotor speed, the turbine flow rate will be limited by the swept area of the blade. If the rotor speed could be reduced, the annulus area could be increased, and the turbine can then be designed to pass more flow and produce more power. This is the essence of why gas turbines designed for the 50 Hz electricity market, which turn at 3,000 rpm, can be designed with a maximum power output capability which is about 44% greater than an equivalent gas turbine designed for the 60 Hz market (which turns at 3,600 rpm). If the gas turbine engine could be designed with modular components, a separate low pressure system comprising a low pressure compressor and turbine could be designed to operate at lower speeds to permit significantly larger quantities of air to be delivered to the high pressure (core) of the gas turbine.

In prior art IGTs, size and speed, $AN^2$, and limits on the past stage turbine blade eventually lead to efficiency drop-off as pressure ratio and turbine inlet temperatures are increased. In addition, as pressure ratio increases, compressor efficiency begins to fall off due to reduction in size of the back end of the compressor which leads to higher losses. At higher pressure ratios, very small airfoil heights relative to the radius from the engine centerline are required. This leads to high airfoil tip clearance and secondary flow leakage losses. The twin spool turbocharged IGT of the present invention solves these prior art IGT issues by increasing the flow size of a prior art large IGT up to a factor of 2. Normally, this flow size increase would be impossible due to turbine $AN^2$ limits. The solution of the present invention is to switch from single spool to double spool which allows for the last stage turbine blade to be designed at a lower RPM which keeps the turbine within typical limits. A conventional design of a dual spool engine would place the electric generator on the low spool, fixing the speed of the electric generator, and have a higher RPM high spool engine. With the twin spool turbocharged IGT of the present invention, the electric generator is located on the high spool, and has a variable speed low spool. This design provides numerous advantages. Since the low spool is untied from the grid frequency, a lower RPM than synchronous can be selected allowing the LPT to operate within $AN^2$ limits. Another major advantage is that the low spool RPM can be lowered significantly during operation which allows for a much greater reduction of engine air flow and power output than can be realized on a machine with a fixed low spool speed. The twin spool turbocharged IGT of the present invention maintains a higher combustion discharge temperature at 12% load than the prior art single spool IGT operating at 40% load. In the twin spool turbocharged IGT engine of the present invention, power was reduced by closing the inlet guide vanes on the high pressure compressor. Low and high pressure compressor aerodynamic matching was accomplished using a variable LPT vane which reduces flow area into the LPT, thus reducing low spool RPM.

A prior art single spool IGT is capable of achieving a low power setting of approximately 40-50% of max power. The twin spool turbocharged IGT of the present invention is capable of achieving a low power setting of around 12% of max power. This enhanced turndown capability provides a major competitive advantage given the requirements of flexibility being imposed on the electrical grid from variable power generation sources.

In FIG. 5, a HRSG (Heat Recovery Steam Generator) 40 with stack 41 is used to take the exhaust gas from the gas turbines 52 and 61 through line 64 and produce steam for use in high pressure steam turbine 36 and low pressure steam turbine 37 that are both connected to drive a second electric generator 38. The exhaust finally is discharged through a stack 41. The dash line 68 in FIG. 5 represents a direct connection from the exhaust of the high pressure gas turbine to the HRSG 40 which would bypass the low pressure gas turbine 61.

During periods of high electrical power demand, the main engine with the high pressure compressor 51 and high pressure gas turbine 52 is operated to drive the electric generator 55 with the gas turbine 52 exhaust going into the power or low pressure gas turbine 61 to drive the low pressure compressor 62. The exhaust from the low pressure gas turbine 61 then flows into the HRSG 40 to produce steam to drive the two steam turbines 36 and 37 that drive the second electric generator 38. The low pressure compressed air from the low pressure compressor 62 flows into the inlet of the high pressure compressor 51.

During periods of low electrical power demand, the low pressure gas turbine 61 and the low pressure compressor 62 is operated at low speed and the exhaust from the high pressure gas turbine 52 flows into the HRSG 40 through the low pressure gas turbine 61 and line 64 to produce steam for the two steam turbines 36 and 37 that drive the second electric generator 38 and thus keep the parts of the HRSG hot for easy restart when the engine operates at higher loads. Flow into the high pressure compressor 51 is reduced to 25% of the maximum flow. Thus, the main engine (51, 52, 53) can go into a very low power mode. The prior art power plants have a low power mode of 40% to 50% (with inlet guide vanes in the compressor) of peak load. The turbocharged IGT engine of the present invention can go down to 25% of peak load while keeping the steam temperature temporarily high of the power plant hot (by passing the hot gas flow through) for easy restart when higher power output is required. The intercooler 65 can also include water injection to cool the low pressure compressed air.

At part power conditions between full power and the lowest power demand, it may be necessary to operate the low pressure compressor 62 and low pressure turbine 61 at an intermediate rotor speed. A means for controlling the engine is necessary in order to reduce low spool rotor speed without shutting off completely, while ensuring stable operation of the low pressure compressor 62 and high pressure compressor 51. Without a safe control strategy, part power aerodynamic mismatching of the compressor can lead to compressor stall and/or surge, which is to be avoided for safety and durability concerns. A convenient way to control the low rotor speed while correctly matching the compressors aerodynamically is by means of a variable low pressure turbine vane 63. Closing the variable low pressure turbine vane 63 at part power conditions reduces the flow area and flow capacity of the low pressure turbine 61, which subsequently results in a reduction of low pressure spool (61, 62) rotational speed. This reduction in rotor speed reduces the air flow through the low pressure compressor 62 which provides a better aerodynamic match with the high pressure compressor 51 at part power.

Figure 6:
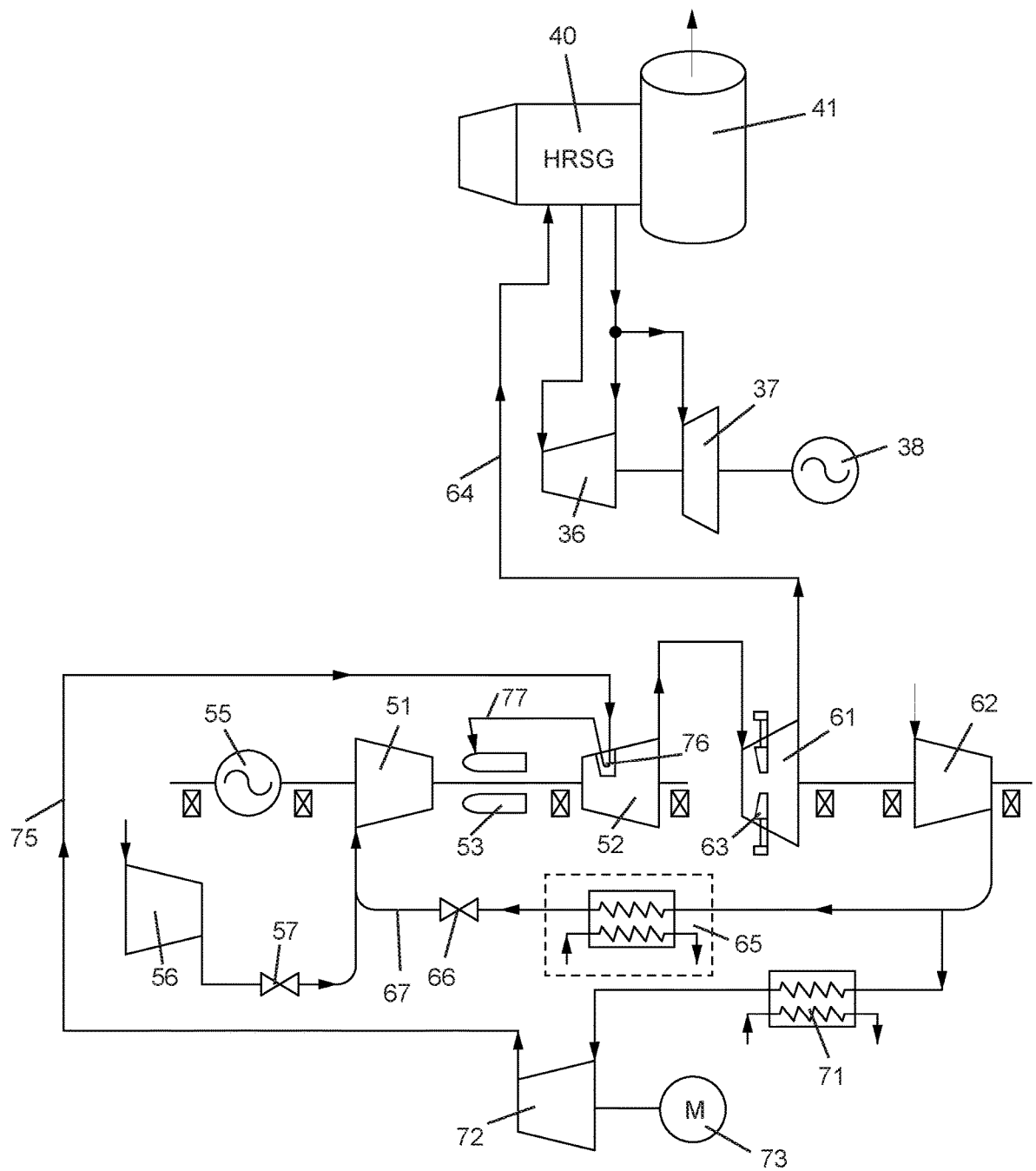
FIG. 6 shows a diagram of a power plant with a second embodiment of a mechanically uncoupled twin spool turbocharged industrial gas turbine engine of the present invention.

The embodiment of FIG. 6 is similar to that in FIG. 5 but with the addition of cooling air used for the high pressure turbine 52 stator vanes 76 that are then discharged into the combustor 53 of the high spool. To increase an overall efficiency of the electrical energy producing power plant of the present invention (FIG. 6), some of the compressed air discharged from the low pressure compressor 62 can be passed through an intercooler 71, through a compressor 72 driven by a motor 73, through line 75 and then used to cool the stator vanes 76 in the high pressure gas turbine 52 of the high speed spool. This cooling air is then passed through line 77 and is discharged into the inlet of the combustor 53 and combined with the compressed air from the high pressure compressor 51 for combustion with a fuel to produce the hot gas flow used to drive the two gas turbines 52 and 61. The amount of compression produced by the cooling air compressor 72 is sufficient to overcome the pressure losses from cooling the stator vanes 76 and to maintain sufficient overpressure to flow into the combustor 53. The LPC 62 flow not passed to the intercooler 71 is passed through an optional intercooler 65 along the path to the high pressure compressor 51 inlet.

Figure 7:
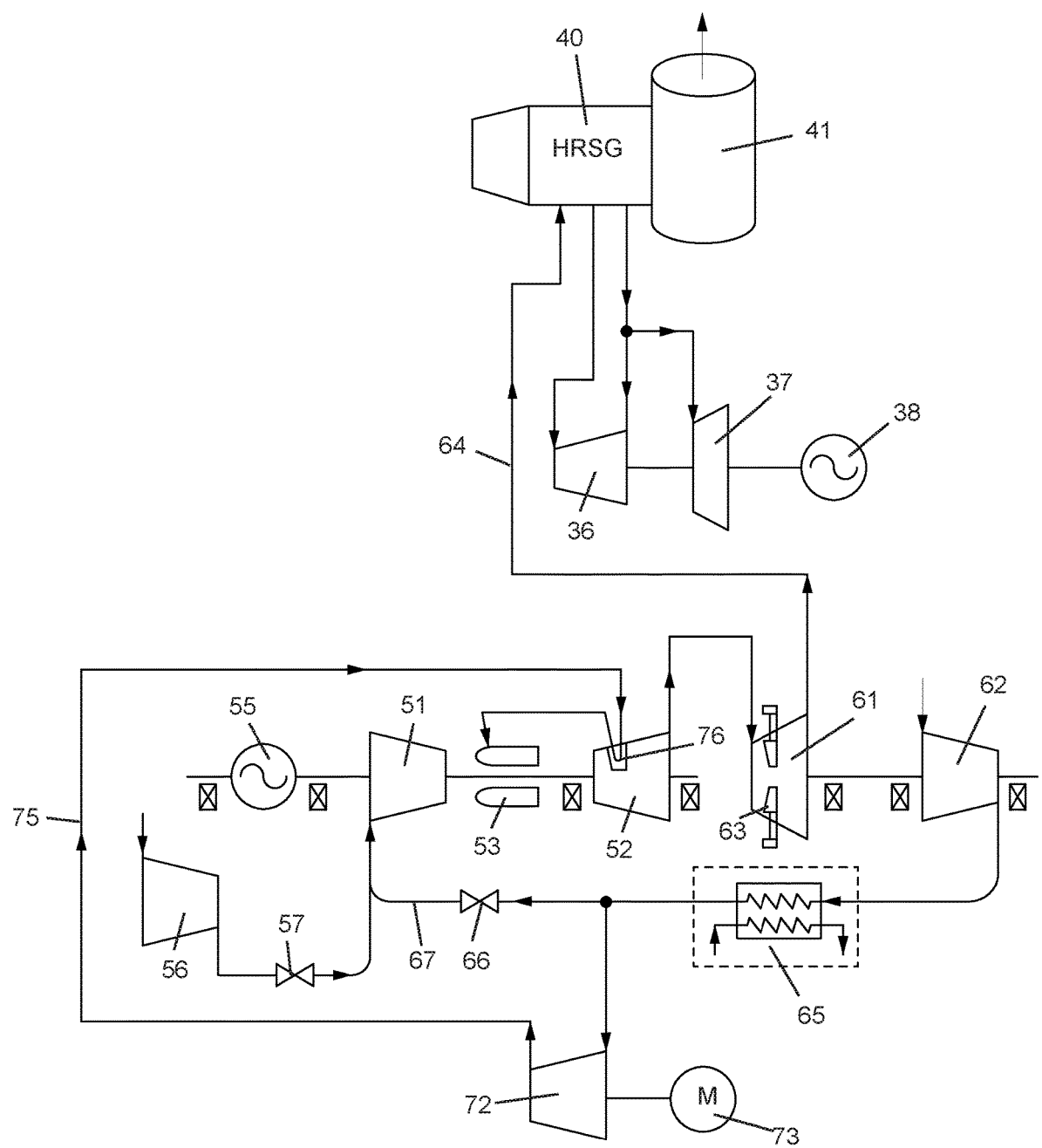
FIG. 7 shows a diagram of a power plant with a third embodiment of a mechanically uncoupled twin spool turbocharged industrial gas turbine engine of the present invention.

The embodiment of FIG. 7 is similar to the embodiment in FIG. 6, but with only one intercooler 65 used to cool the compressed air going into the high pressure compressor 51 and the stator vanes 76 of the high pressure turbine 52. A cooling air compressor 72 driven by a motor 73 is used to increase the pressure of the low pressure compressor 62 high enough to pass through the stator vanes 76 with enough pressure to flow into the combustor 53 at around the same pressure as the high pressure compressor outlet for discharge into the combustor 53.

Figure 10:
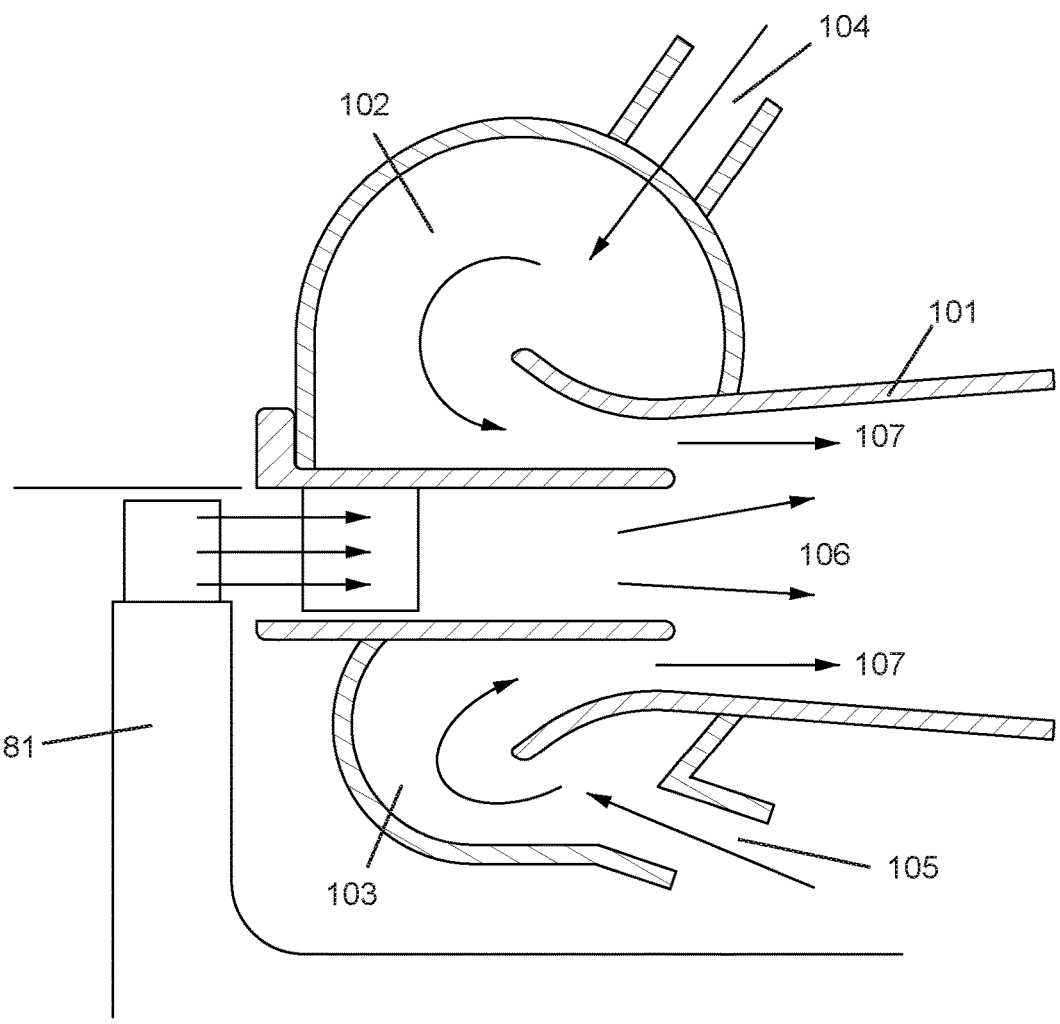
FIG. 10 is a cross sectional view of a diffuser used between a compressor and a combustor in the turbocharged gas turbine engine of the present invention.

In the gas turbine engine embodiment of FIGS. 6 and 7, the compressed air used to cool the stator vanes in the high pressure turbine is injected into the combustor 53. In a further embodiment of the present invention, a diffuser 101 (see FIG. 10) is positioned between an outlet of the high pressure compressor 51 and an inlet of the combustor 53 that diffuses the compressed air flow. To control a boundary layer flow of the diffused air flow, the cooling air from the stator vanes return passage 104 and from the rotor blades return passage 105 of the high pressure turbine 52 is discharged into the diffuser 101 to merge with the compressed air from the high pressure compressor 81 prior to entering the combustor 53. In the FIG. 10 embodiment, the cooling air 107 from the stator vanes 76 is discharged into an outer plenum 102 surrounding the diffuser 101 that directs the cooling air flow 107 in a direction parallel to the discharged compressed air 106 from the compressor 81. In a similar method, the cooling air from the rotor blades is discharged into an inner plenum 103 where the cooling air 107 flows parallel to the discharged compressed air 106 from the compressor. The cooling air 107 from the two plenums 102 and 103 is accelerated to a velocity equal to or greater than the velocity of the compressed air 106 from the compressor 81 in order to prevent the boundary layer from forming.

Figure 11:
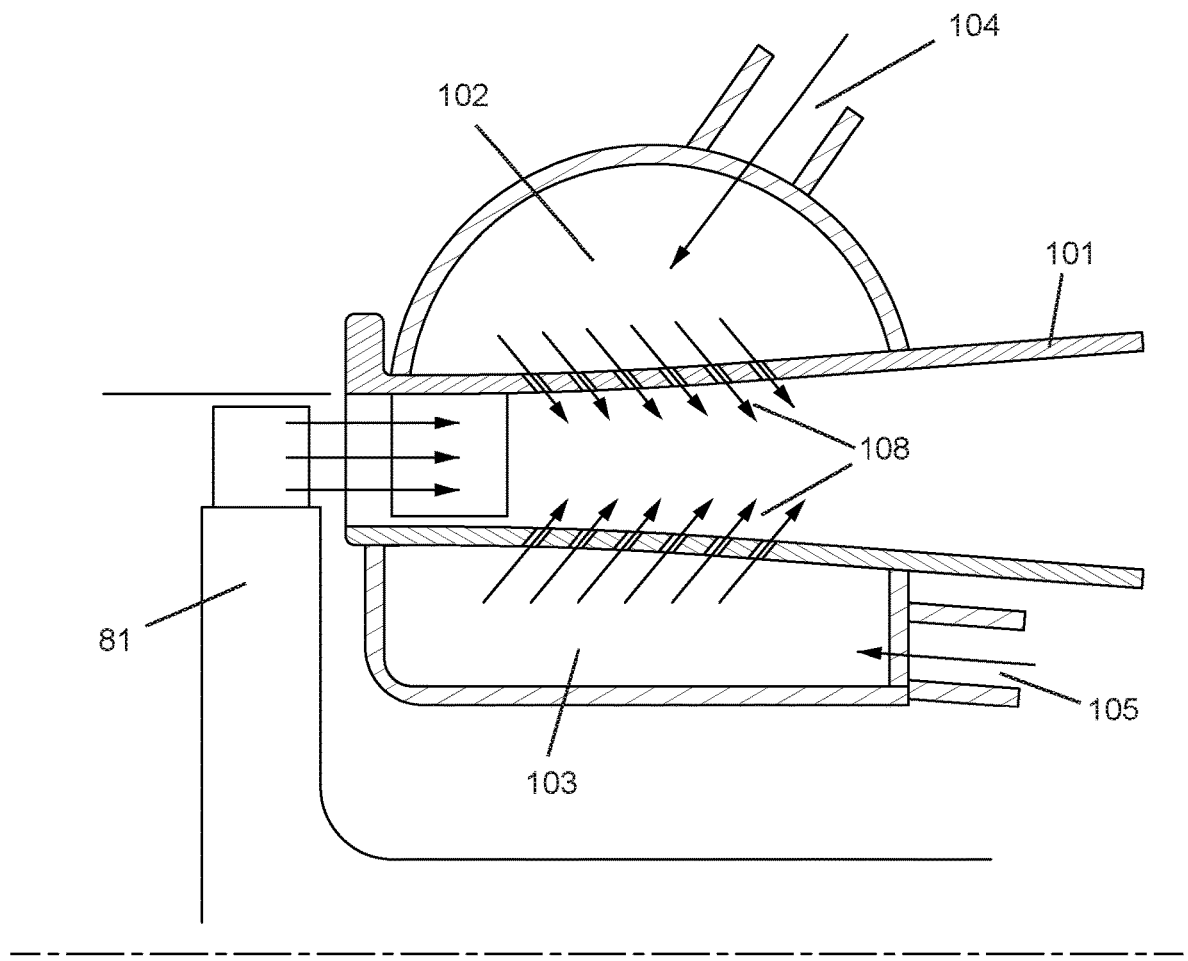
FIG. 11 is a cross sectional view of a second embodiment of a diffuser used between a compressor and a combustor in the turbocharged gas turbine engine of the present invention.
Figure 12:
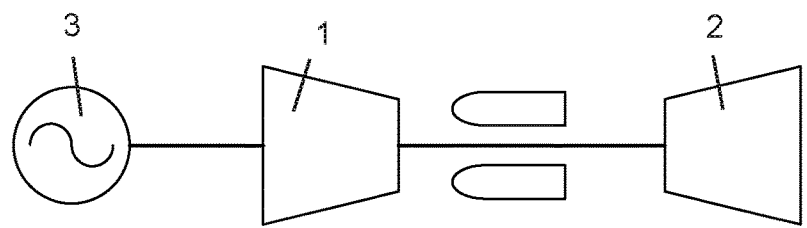
FIG. 12 shows a prior art single shaft spool IGT engine with a direct drive electric generator on the compressor end.
Figure 13:
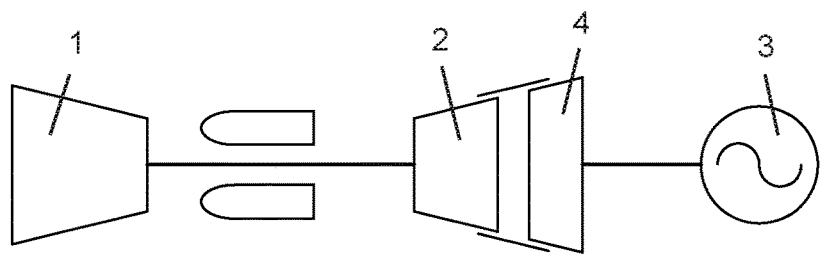
FIG. 13 shows a prior art dual shaft IGT engine with a high spool shaft and a separate power turbine that directly drive an electric generator.
Figure 14:
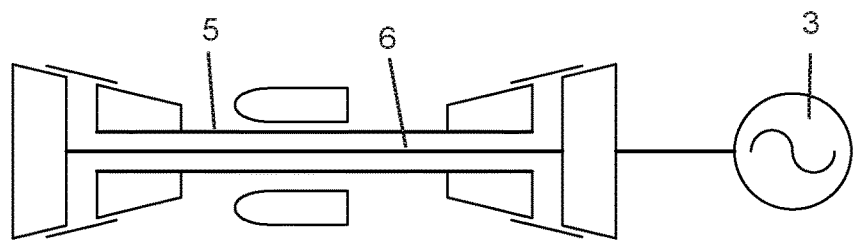
FIG. 14 shows a prior art dual shaft aero gas turbine engine with concentric spools in which a high spool rotates around the low spool, and where a separate low pressure shaft that directly drives an electric generator.
Figure 15:
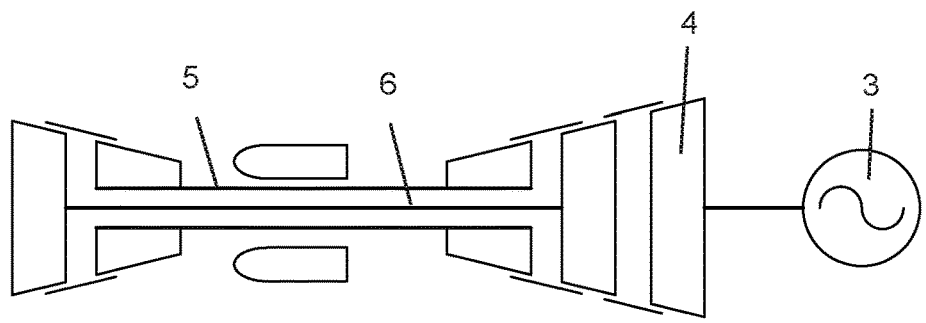
FIG. 15 shows a prior art three-shaft IGT engine with a low pressure spool rotating within a high pressure spool, and a separate power turbine that directly drives an electric generator.

FIG. 11 shows a second embodiment of the diffuser 101 in which the cooling air flow from the stator vanes return passage 104 and the rotor blades return passage 105 is discharged into the diffuser 101 through an arrangement of film cooling holes 108.

Figure 8:
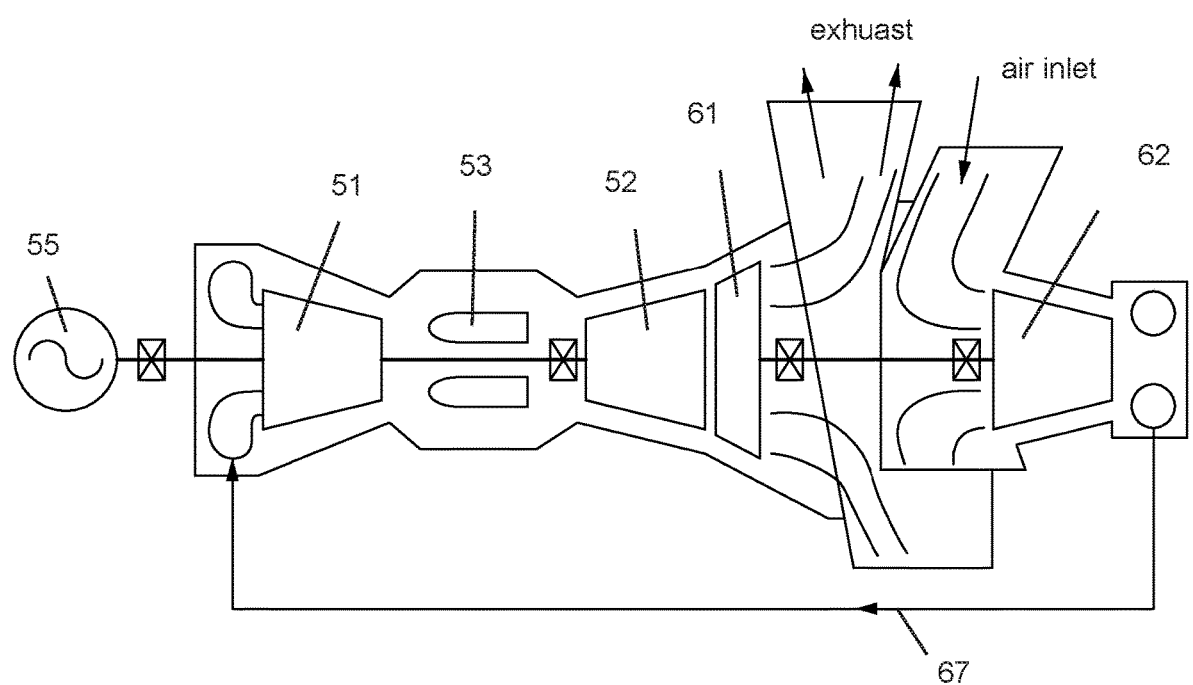
FIG. 8 shows a diagram of a gas turbine engine with a fourth embodiment of a mechanically uncoupled twin spool turbocharged industrial gas turbine engine of the present invention.

FIG. 8 shows a cross sectional arrangement of a twin spool turbo-charged IGT for the present invention. The low pressure turbine 61 with variable area nozzle is located within a flow case just behind the exit from the high pressure turbine 52 so that the flow from the high pressure turbine 52 flows directly into the low pressure turbine 61 without loss. The rotor shaft from the LPT 61 to the LPC 62 passes through the case that forms the exhaust for the turbine hot gas and the inlet for the air into the LPC 62. The LPC 62 is connected by the line 67 to an inlet of the HPC 51. The high spool (with HPC 51 and HPT 52) directly drives an electric generator 55.

Figure 9:
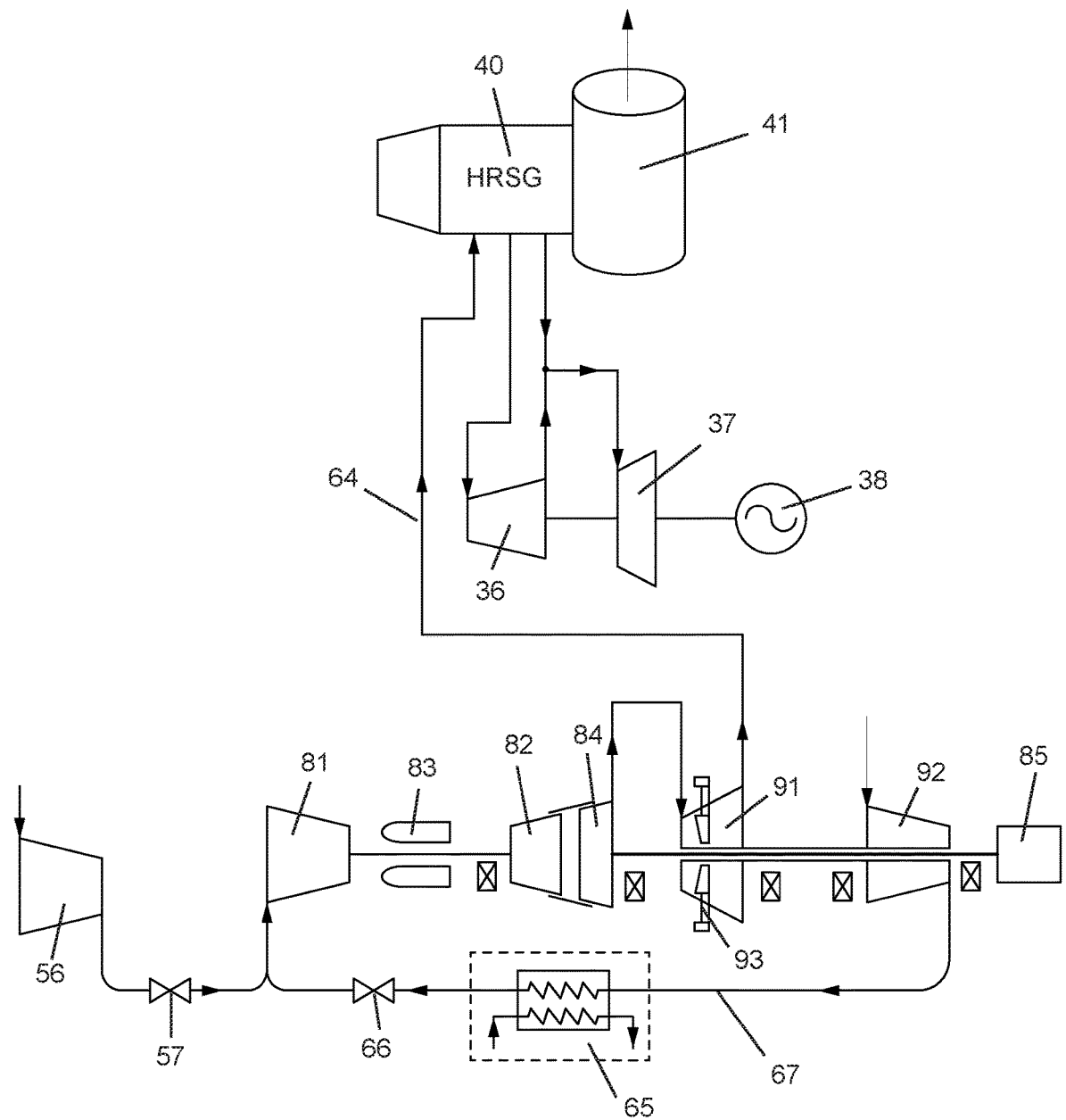
FIG. 9 shows a cross sectional view of a power plant with a mechanically uncoupled turbocharged three shaft industrial gas turbine engine of the present invention.

FIG. 9 shows an embodiment of the present invention in which the power plant can be used to drive a load 85 where the load can be an electric generator or a compressor or a screw propeller for a ship. The power plant in FIG. 9 includes the high spool and the low spool like in previous embodiments, but with an intermediate pressure power turbine (IPPT) 84 that is driven by exhaust from the HPT 82 to drive the load 85 through a free shaft (FS). A high pressure compressor 81 is rotatably connected to a high pressure turbine 82 through a rotor with a combustor 83 located in-between to form the high spool. A low pressure turbine 91 is rotatably connected to a low pressure compressor 92 to form the low spool. The LPT 91 includes variable inlet guide vanes or nozzles 93. The high pressure compressor 81 also has multiple variable stator vanes (VSV). An intermediate pressure power turbine (IPPT) 84 is located immediately downstream from the HPT 82 and is rotatably connected to the load 85 through a free shaft (FS) 86 that passes through the inside of the rotor shaft of the low spool. A compressed air line 67 connects the outlet of the LPC 92 to an inlet of the HPC 81, and can include an intercooler 65 to cool the compressed air. A boost compressor 56 can be used to supply low pressure compressed air to the HPC 81 when the low spool (91, 92) is running low. An optional HRSG 40 is connected to the LPT 91 exhaust to convert the turbine exhaust into steam and drive the high pressure steam turbine 36 and the low pressure steam turbine 37 that both drive the electric generator 38. The power turbine 84 and the HPT 82 are located within a case close to one another as are the LPT 61 and HPT 52 in FIG. 8. The HRSG might not be needed if the engine is used to propel a ship.

The twin spool IGT engine of FIG. 9 shows another novel arrangement which has many of the same attributes of FIGS. 5-7 embodiments. However, the mechanical or generator load speed is allowed to operate independent of the gas turbine high pressure shaft speed via a low pressure shaft connected to the load. This independent load shaft speed attribute is usually most important for mechanical loads. The free shaft 86 is still free to slow down for improved part load performance and low turndown to 12% load. Of note, the low pressure shaft is passed through the inner diameter (ID) of the free shaft (FS) since the FS runs at low speed and higher radius compared to the HP shaft. Thus, the HP shaft speed can remain high in this arrangement.

Options for the FIG. 9 power plant include: intercool the entire flow from the LPC 92 to the HPC 81; intercool only the compressed air that is used to cool the stator vanes in the HPT 82; and intercool only the cooling air used for the cooling of the stator vanes and over-pressurize the cooling air with a separate boost compressor. In all of the arrangements, a variable geometry HPC 81 is used to control speed along with the variable LPT vane 93.

Figure 16:
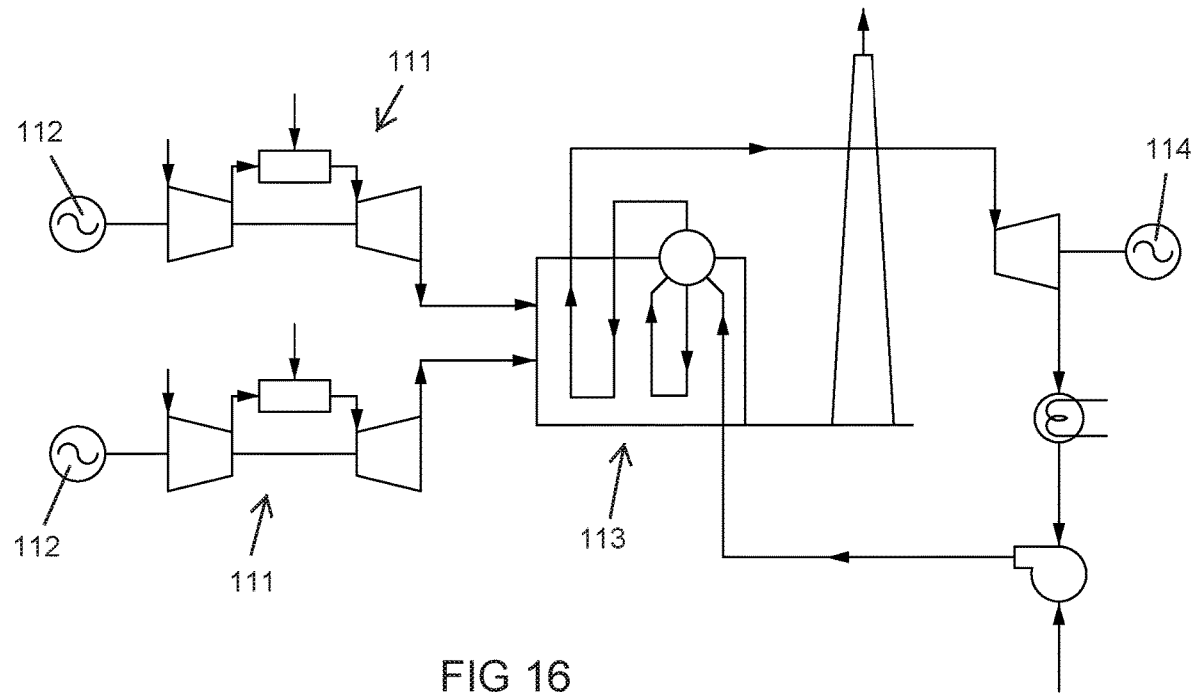
FIG. 16 shows a combined cycle power plant of the prior art in which two industrial gas turbine engines are used.

FIG. 16 shows a combined cycle power plant used to generate electricity of the prior art in which two single spool industrial gas turbine engines 111 each drive an electric generator 112, and a HRSG (Heat Recovery Steam Generator) 113 that uses the hot turbine exhaust gas from both engines 111 to produce steam that is used to drive a third electric generator 114. The current state-of-the-art large scale industrial gas turbines utilize an overall system component technology system architecture that is fundamentally consistent across the industry and has served well for many years. The mechanical design arrangements of these machines have evolved to systems that are focused on simplicity, functionality, and serviceability. For example, the engine cases are typically split longitudinally, in parallel with the engine centerline, to permit the top half of the engine to be removed from the bottom half for serviceability. For simplicity, the turbine rotors, comprising both the compressor and turbine, are predominantly composed of a single shaft with one end of the shaft coupled directly to the electric generator to permit large amounts of power transfer without the need of an efficiency decreasing gearbox. In large frame heavy duty industrial engines, a gear box cannot be used because the power output of the industrial engine exceeds the capability of the gear box. Due to these factors, gas turbines must operate with a very specific rotor speed equal to the synchronization speed of the local electrical power grid such as at 60 hertz for US engines and 50 hertz for European engines. While this practice is simple and functional, tradeoffs have been made relative to performance of the machine that affects the efficiency, operability, performance, and turn-down (part-power) capability.

While the evolution of the current state-of-the-art industrial gas turbine engine has found broad utility in the electricity generation market, the efficiency of these machines is limited because of the engineering tradeoffs that have been accepted without that evolution. Interestingly, the evolution of gas turbine engines for aircraft propulsion has taken a decidedly different direction. There, weight, performance/efficiency, and operability are the design drivers that are paramount to the successful evolution of turbomachinery for that application. To improve efficiency, aircraft (aero) engines have been designed to operate at higher pressure ratios than industrial (IGT) engines. Further, the vast majority of aircraft (aero) gas turbine systems have multiple shafts whereby the low pressure components (i.e., low pressure compressor, low pressure turbine) reside on what is called a low spool. High pressure components such as the high pressure compressor and the high pressure turbine reside on the high spool. The two spools operate at different speeds to optimize the efficiency of each spool. The use of multiple shafts in a gas turbine engine yields benefits that increase component and overall efficiency, increase power output, improve performance matching, and improve operability. The latter is manifested in both responsiveness of the engine and in part-power performance.

The twin spool turbocharged industrial gas turbine engine of the present invention offers many advantages relative to the current state-of-the-art engines. By separating the components of the gas turbine into modular systems, each can then be individually optimized to provide maximum performance within an integrated system. In addition, substantial power output and operability improvements can be obtained.

In one example, the efficiency of the gas turbine can be increased using modular components. The efficiency of the gas turbine is known to be largely a function of the overall pressure ratio. While existing IGTs limit the maximum compressor pressure ratio that can be achieved because optimum efficiency cannot be achieved simultaneously in the low and high pressure regions of the compressor while both are operating at the same (synchronous) speed, an arrangement that allows the low and high pressure compressors to each operate at their own optimum rotor speeds will permit the current overall pressure ratio barrier to be surpassed. In addition, segregating the low and high pressure systems is enabling for improving component efficiency and performance matching. For example, the clearances between the rotating and non-rotating hardware such as in clearances between rotating blade tips and stationary outer shrouds or ring segments of existing IGTs must be relatively large because of the size of the components in the low pressure system. In the configuration of the present invention, the clearances in the high pressure system could be reduced to increase efficiency and performance.

In another example, the component technology of the turbocharged IGT engine of the present invention enables a more operable system such that an engine can deliver higher efficiency at turn-down or part power, and responsiveness of the engine can be improved. Further, this modular arrangement allows for a greater level of turndown than is otherwise available from the prior art large frame heavy duty IGTs of the prior art. This is important when considering the requirements imposed on the electrical grid when intermittent sources of power such as solar and wind become an increasing percentage of the overall capacity.

In yet another example, the power output and mass flow of prior art large frame heavy duty IGTs is limited by the feasible size of the last stage turbine rotor blade. The length of the last stage turbine rotor blade is stress-limited by the product of its swept area (A) and the square of the rotor speed (N). This is referred to in the art as the turbine $AN^2$. For a given rotor speed (N), the turbine flow rate will be limited by the swept area of the last stage blade. If the rotor speed (N) could be reduced, the annulus area could be increased, and the turbine can then be designed to pass more flow and produce more power. This is the essence of why gas turbines designed for the 50 Hertz (3,000 rpm) electricity market can be designed with a maximum power output capability which is about 44% greater than an equivalent gas turbine designed for the 60 Hertz (3,600 rpm) market. If the gas turbine engine could be designed with modular components, a separate low pressure system comprising a low pressure compressor and turbine could be designed to operate at lower speeds to permit significantly larger quantities of airflow to be delivered to the high pressure (core) of the gas turbine engine.

Limitations exist in the prior art gas turbine engine design. Size and speed, $AN^2$, limits on the last stage turbine rotor blade eventually lead to efficiency drop-off as pressure ratio and turbine inlet temperature (TIT) are increased. In addition, as pressure ratio increases, compressor efficiency begins to fall off due to reduction in size of the back end of the compressor which leads to higher losses. The root cause of that efficient aerodynamic work per stage improves with higher airfoil rotational speed. This means that the aerodynamic engineer tries to keep a relatively high radius placement. At high pressure ratios, this leads to very small airfoil heights relative to radius from the engine centerline. This leads to high airfoil tip clearance and high secondary flow leakage losses.

Higher engine efficiency is obtained with higher pressure ratio and higher turbine inlet temperature. The first obstacle is reduction of component efficiencies due to size effects because of the higher pressure ratio. The IGT engine of the present invention solves this issue by increasing the flow size of a typical large frame IGT by a factor of 2. Normally, this flow size increase would be impossible due to the turbine $AN^2$ limits. The IGT engine of the present invention solution is to switch from a single spool engine to a dual spool engine with the two spools capable of operating independently where the low spool does not rotate within the high spool. This allows for the last stage blade to be designed at a lower RPM which keeps the turbine within limits. Prior art design of a dual spool engine would place the electric generator on the low spool, fixing its speed, and have a higher RPM high spool engine. The IGT engine of the present invention goes against this convention and places the electric generator on the high spool, and has a variable speed low spool. This arrangement provides for numerous advantages. Since the low spool is untied from the grid frequency, a lower PRM than synchronous can be selected allowing for the LPT to operate within $AN^2$ limits. Another major advantage is that the low spool RPM can be lowered significantly during operation which allows for a much greater reduction of engine air flow, and power can be realized on a machine with a fixed low speed spool. The IGT engine of the present invention can maintain a higher combustion discharge temperature at 12% load than the prior art single spool IGT engines operating at a 40% load.

Figure 17:
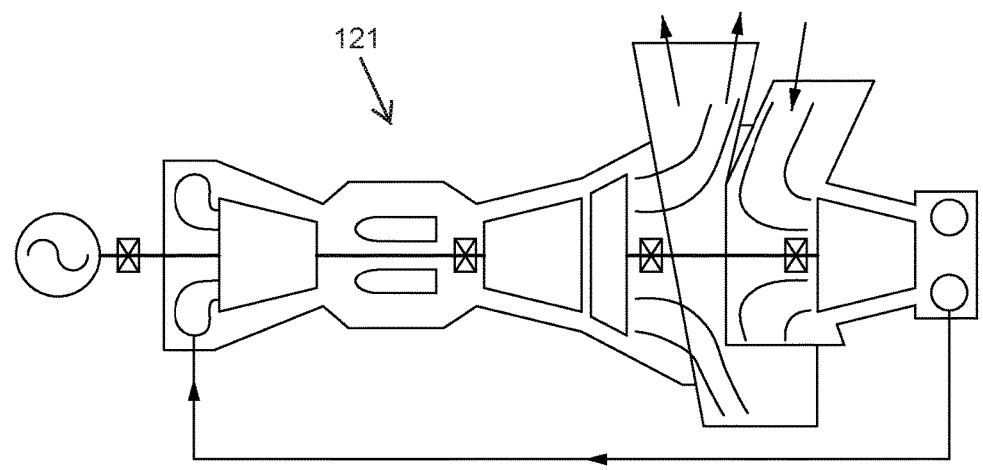
FIG. 17 shows the twin spool turbocharged industrial gas turbine engine of the present invention that is used to replace the two industrial engines in the FIG. 16 power plant.

The higher efficient and more powerful IGT engine of the present invention (FIG. 17) can be used to retrofit an existing combined cycle power plant like that shown in FIG. 16 by replacing the two prior art IGT engines 111 with one of turbo IGT engine 121 of the present invention (FIG. 17) in which the turbine exhaust temperature of the new engine is significantly the same as the turbine exhaust temperatures of the two older engines so that the HRSG does not require modifications except for minor rework of the exhaust ducts channeling the hot turbine exhaust from the IGT outlet to the inlet of the HRSG 113, which is not considered to be a modification of the HRSG itself. Thus, no modifications to the HRSG system itself would be required with the new turbo IGT engine. The largest know industrial gas turbine engines today have a maximum power output of 350 MW for a 60 Hertz engine and 700 MW for a 50 Hertz engine. The turbo IGT engine of the present invention can produce a power output of over 700 MW for the 60 Hertz engine and over 1,000 MW for the 50 Hertz engine. Because the turbo IGT engine 121 of the present invention has more than twice the flow of each of the prior art IGT engines 111, and costs about the same as one of the prior art engines 111, one new engine can be used to replace two older engines while allowing for greater plant efficiency. In this retrofit, the turbine exhaust from the engine 121 will be directed into the HRSG to produce steam that drives the HRSG generator 114. With the new turbo IGT engine 121 installed and the two older IGT engines 112 removed, a new electric generator can be installed that would produce electric power in a range similar to the output power of the new engine 121. In another embodiment, to save costs the two older generators 112 could be reused and connected in series to be driven by the single new engine 121.

Figure 26:
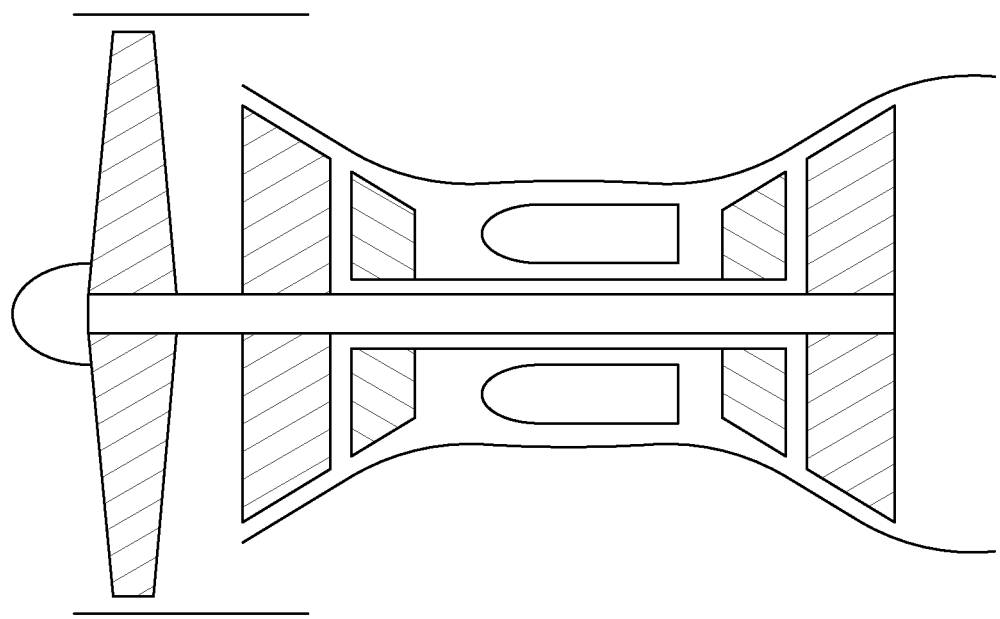
FIG. 26 shows a cross section view of a prior art twin spool aero gas turbine engine with a high spool concentric with and rotatable around the low spool.
Figure 27:
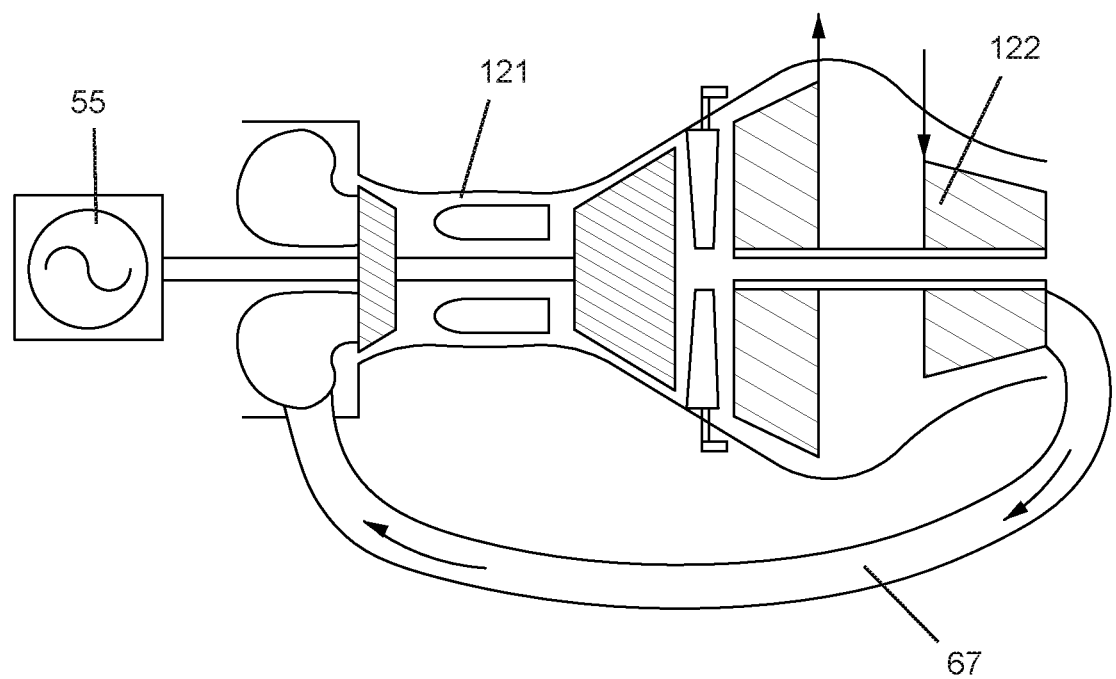
FIG. 27 shows a cross section view of a mechanically uncoupled twin spool turbocharged industrial gas turbine engine of the present invention.

FIG. 27 shows a twin spool turbocharged IGT of the present invention that does not require an intercooler 65 for cooling the compressed air that is delivered to the stator vanes of the turbine like in the FIG. 9 embodiment. The power turbine can be operated rotational independently of the main core engine 121 that drives the electric generator 55 as opposed to the prior art twin spool aero engine shown in FIG. 16. The high pressure spool and the low pressure spool operate together (FIG. 26 aero engine) because the hot gas stream from the combustor must flow through both turbines (the high spool rotates around the low spool) so that both compressors are driven. In the twin spool turbocharged IGT of the present invention, the low pressure spool 122 can operate at different speeds (because the low spool does not rotate within the high spool) while the main core engine 121 (the high spool that drives the electric generator 55) can operate at a constant speed.

Figure 18:
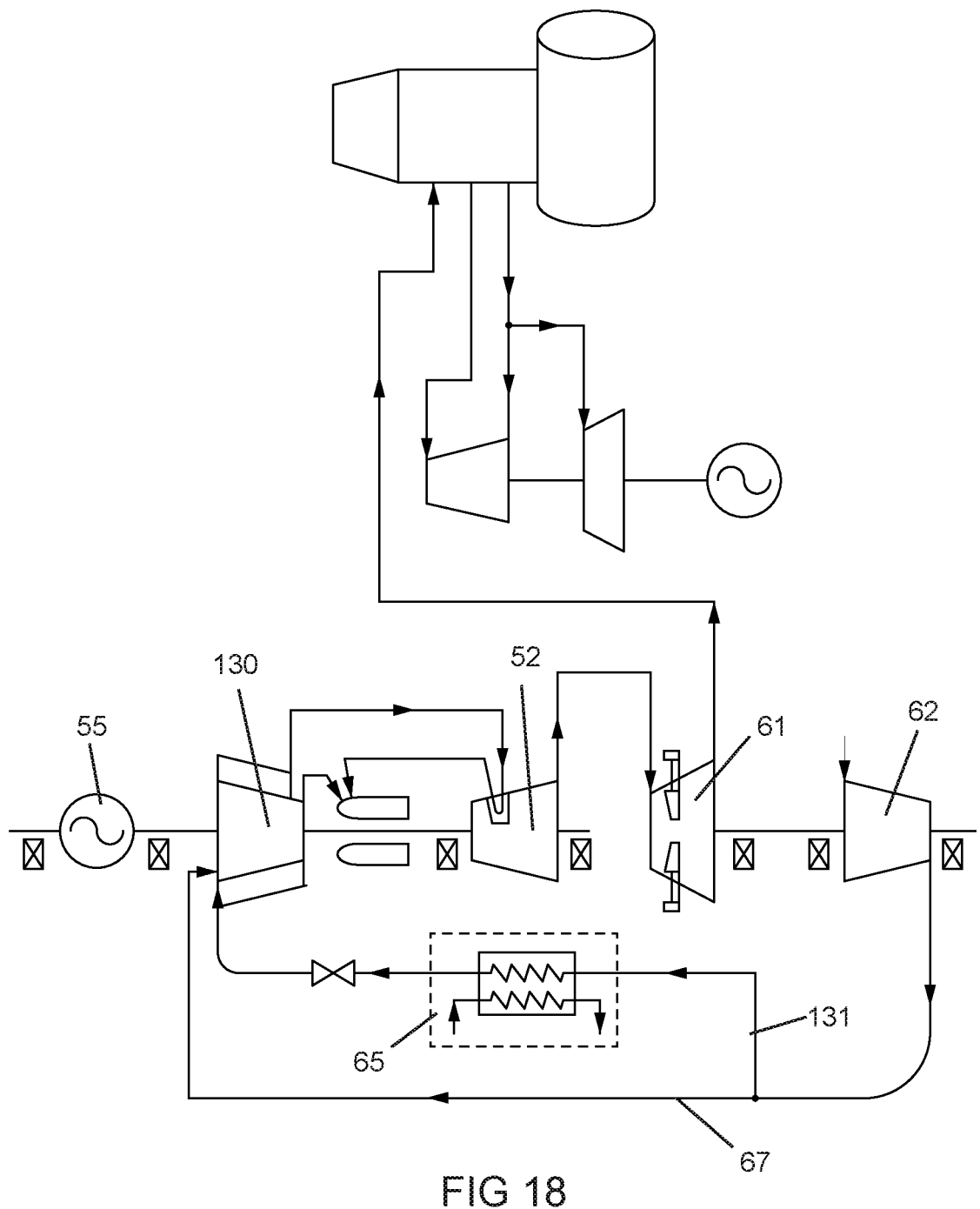
FIG. 18 shows a diagram of a power plant with a mechanically uncoupled twin spool turbocharged industrial gas turbine engine having a dual flow compressor for another embodiment of the present invention.

FIG. 18 shows an illustration of an embodiment of the power plant of the present invention in which the dual flow compressor is used. The high pressure turbine 52 of the main engine drives the dual flow compressor 130 that has an inner flow path separated from but concentric with an outer flow path, where the inner flow path flows into the combustor while the outer flow path flows into the stator vanes for cooling thereof. The compressed air from the low spool compressor 62 is split up into a main flow 67 that flows into the inner flow path of the compressor 130 and a smaller flow 131 (around 20%) that flows through an intercooler 65 to provide cooling. This smaller and cooled compressed air flow then flows into the outer flow path of compressor 130 and then to one or more rows of the stator vanes of the turbine 52 to provide cooling of the stator vanes. The cooling air is then discharged into the combustor. The cooling air from the low spool compressor 62 used for cooling of the stator vanes must be compressed further and cooled in order to adequately cool the stator vanes and have enough pressure to pass through the stator vanes and then flow into the combustor. With the dual flow compressor 130, a separate compressor is not needed to further compress the air from the low spool compressor that is used for cooling the stator vanes.

Figure 19:
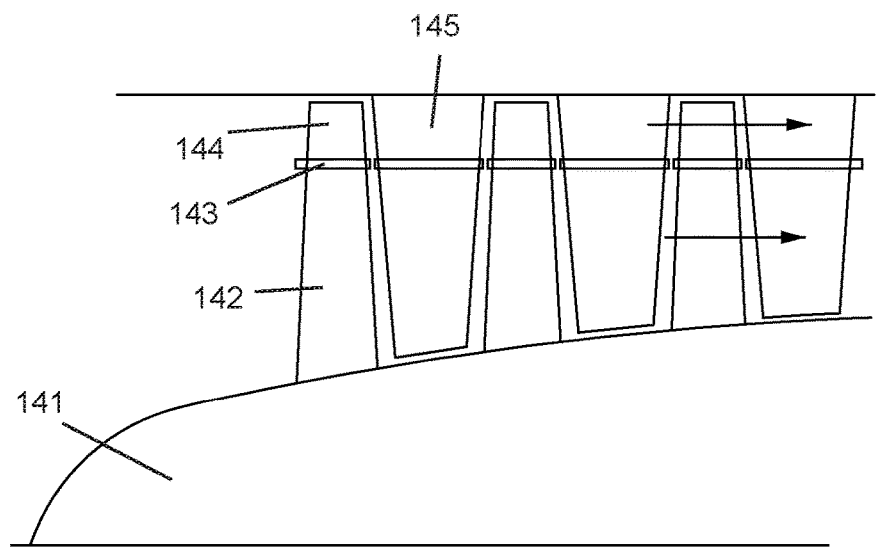
FIG. 19 shows a cross section view of the dual flow compressor with the smaller flow on the outer flow path of the present invention.

FIG. 19 shows one embodiment of the dual flow compressor of the present invention. Rotor blades extend from the rotor 141 with stator vanes 145 extend from the stator or casing. Each rotor blade includes an inner airfoil 142 and an outer airfoil 144 with a shroud 143 separating the two flow paths formed by the inner and outer airfoils. Each stator vane 145 also includes a shroud to separate the inner air flow path from the outer air flow path. A number of stages of blades and vanes are used to compress the air to the desired pressure.

Figure 20:
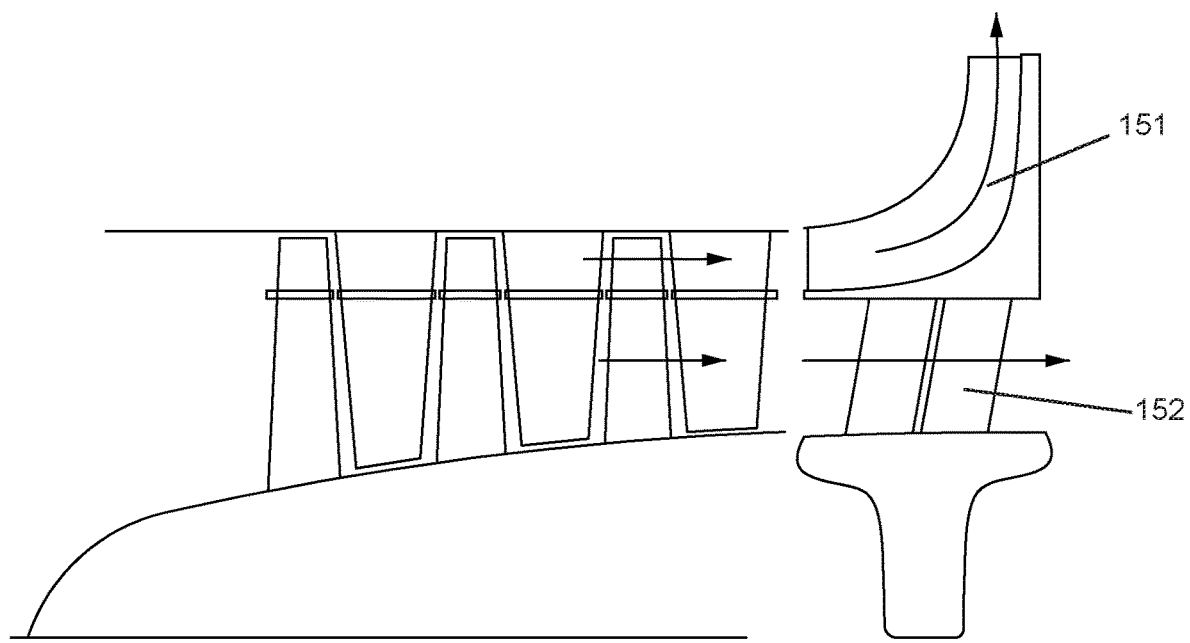
FIG. 20 shows a cross section view of the dual flow compressor of FIG. 19 with a second dual flow compressor located downstream of the present invention.

In FIG. 20, a second compressor is used to further compress the air. The rotor includes a first rotor blade 152 on the inner flow path and a second compressor blade 151 on the outer flow path. The second compressor blade 151 in this embodiment is a centrifugal compressor that can increase the pressure of the outer flow path beyond the pressure in the inner flow path so that turbine stator vane cooling can be performed with enough remaining pressure to dump the cooling air from the stator vanes back into the combustor. The first and second compressors are connected to the same rotor and thus rotate together. Because around 20% of the total compressed air flow is used for cooling of the stator vanes in the turbine, the outer flow path in the FIGS. 19 and 20 embodiments are smaller such that 20% of the total flow through the compressor flow in the outer flow path.

Figure 21:
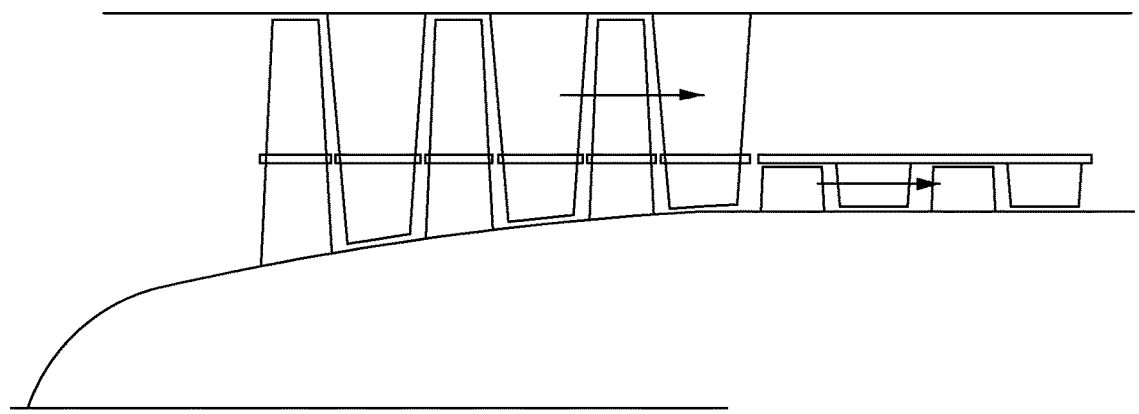
FIG. 21 shows a cross section view of a dual flow compressor with the smaller flow on the inner flow path with additional blades to further compress the inner flow path of the present invention.

FIG. 21 shows a second embodiment of the dual flow compressor of the present invention where the smaller flow path of the 20% flows along the inner flow path. Passing the smaller air flow along the inner flow path provides cooling of the rotor. In the FIG. 21 embodiment, the inner flow path extends further aft with rotor blades and stator vanes than the outer flow path because the inner flow path must be at a higher pressure than the outer flow path since the cooling air from the inner flow path is used for cooling of the turbine stator vanes.

Figure 22:
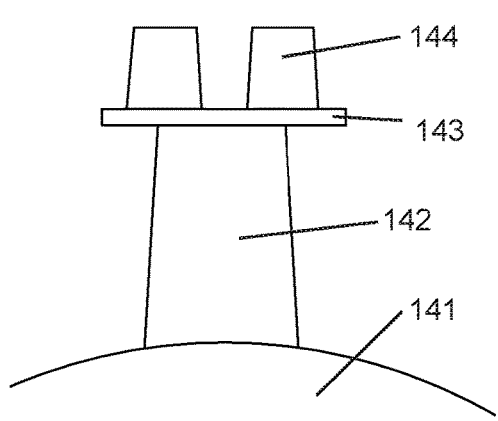
FIG. 22 shows a view of one of the blades in the dual flow compressor of the present invention with multiple blades in the outer flow path with one blade on the inner flow path separated by a shroud.

FIG. 22 shows an embodiment of rotor blades used in the dual flow compressor where one large blade 142 extends from the rotor 141 with a number of smaller blades 144 extending from the shroud 143. Because the outer flow path is smaller, more blades can be used for each stage to compress the air. This blade would be used in the dual flow compressor of FIGS. 19 and 20.

Figure 23:
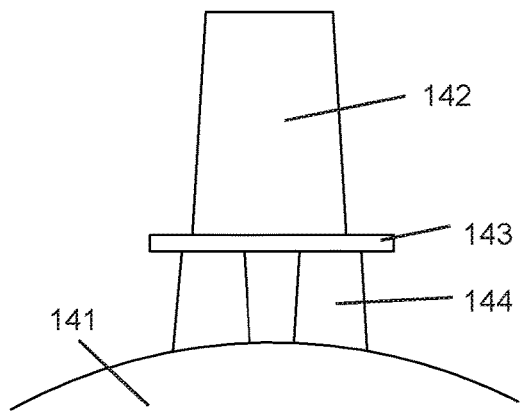
FIG. 23 shows a view of one of the blades in the dual flow compressor of the present invention with multiple blades in the inner flow path and one blade extending from the shroud in the outer flow path.

FIG. 23 shows an embodiment of the blades used in the dual flow compressor of FIG. 21 where the smaller blades 144 are in the inner flow path and the larger blade 142 are in the outer flow path. The shroud 143 separates the two flow paths. Multiple blades 144 can be used in the smaller flow path to keep passage aspect ratios from getting too small. For example, one or more blades 144 can be used. The FIG. 23 embodiment suffers from the issue that the smaller blades 144 must support the large blade 142 located radially outward. If the smaller inner blades can structurally support the larger outer blade, then this embodiment would allow for the compressed air used for cooling the stator vanes to flow along the rotor for additional cooling of the rotor. In the FIG. 23 embodiment, one or more blades 144 can be used.

Figure 24:
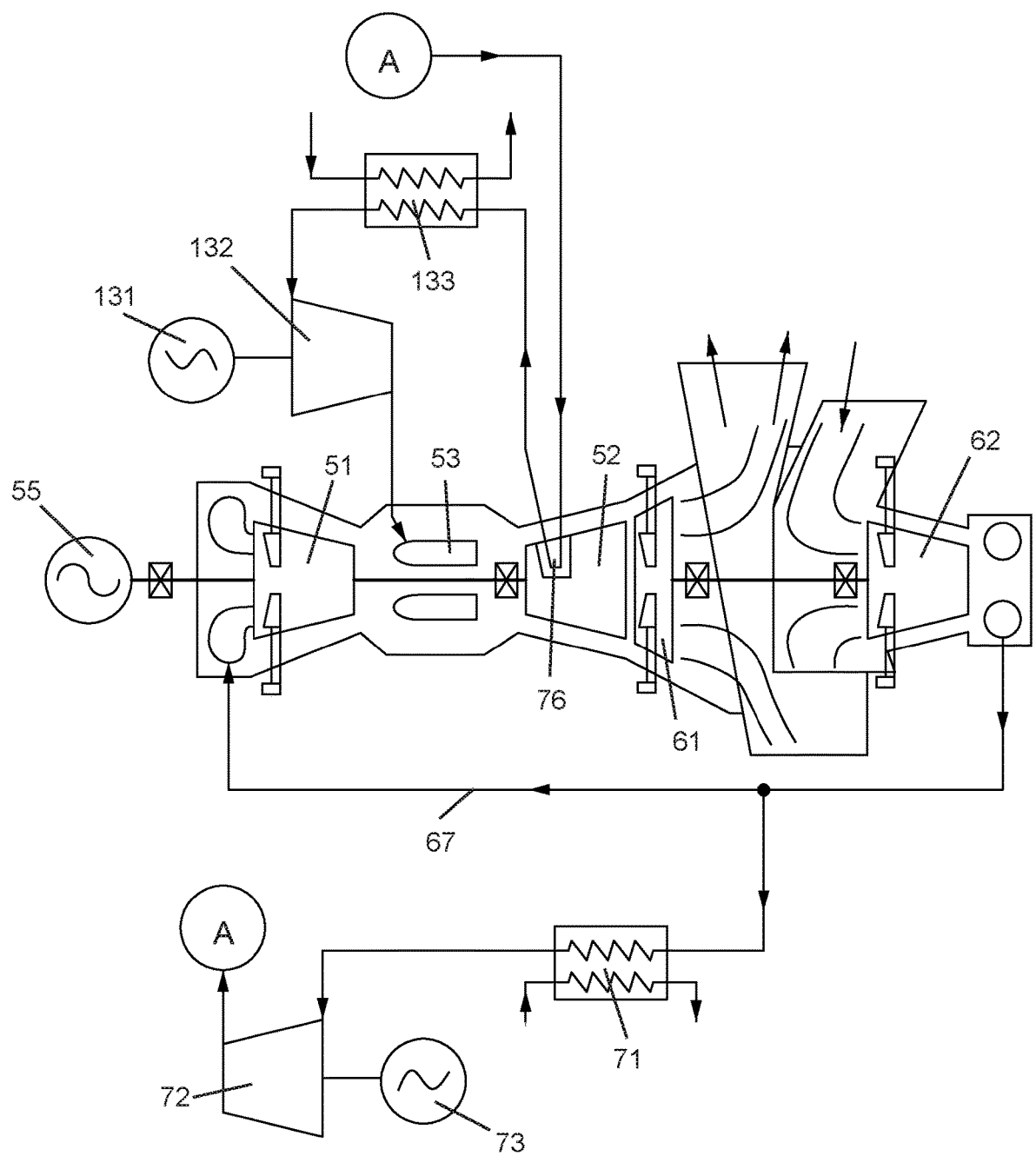
FIG. 24 shows an embodiment of the twin spool turbocharged industrial gas turbine engine of the present invention in which cooling air for the turbine airfoils is cooled and then boosted in pressure prior to discharge into the combustor.

FIG. 24 shows another embodiment of the turbocharged industrial gas turbine engine of the present invention in which the cooling air for the turbine airfoils is boosted in pressure by a boost compressor downstream from the airfoils in order to be discharged into the combustor at about the same pressure as the compressor discharge pressure. Compressed air from the low pressure compressor 62 is bled off from the main bypass flow 67 and passed through an intercooler 71 where the temperature of the compressed air is lowered. The lower temperature compressed air is then boosted in pressure by a first cooling air compressor 72 driven by a motor 73 to a pressure suitable for cooling the turbine airfoils such as the stator vanes 76 in the high temperature turbine 52. The cooling air flows from the cooling air compressor 72 along flow line A into the stator vanes 76. The spent cooling air is then passed from the stator vanes 76 through a second cooling air compressor 132 to boost the pressure so that the compressed air will be at a pressure substantially matching the outlet pressure of the high pressure compressor 51 for discharge into the combustor 53. The spent cooling air from the turbine airfoil 76 may be cooled using an intercooler 133 prior to entering the cooling air compressor 132. With the embodiment in FIG. 18, the compressed air pressure passing through the air cooled airfoils 76 does not have to be high enough to both cool the airfoils and be high enough for discharge into the combustor 53. This would require higher pressure seals. Additionally, the extra pressure is added to the cooling air after passing through the air cooled airfoils so that lower pressure seals can be used.

Figure 25:
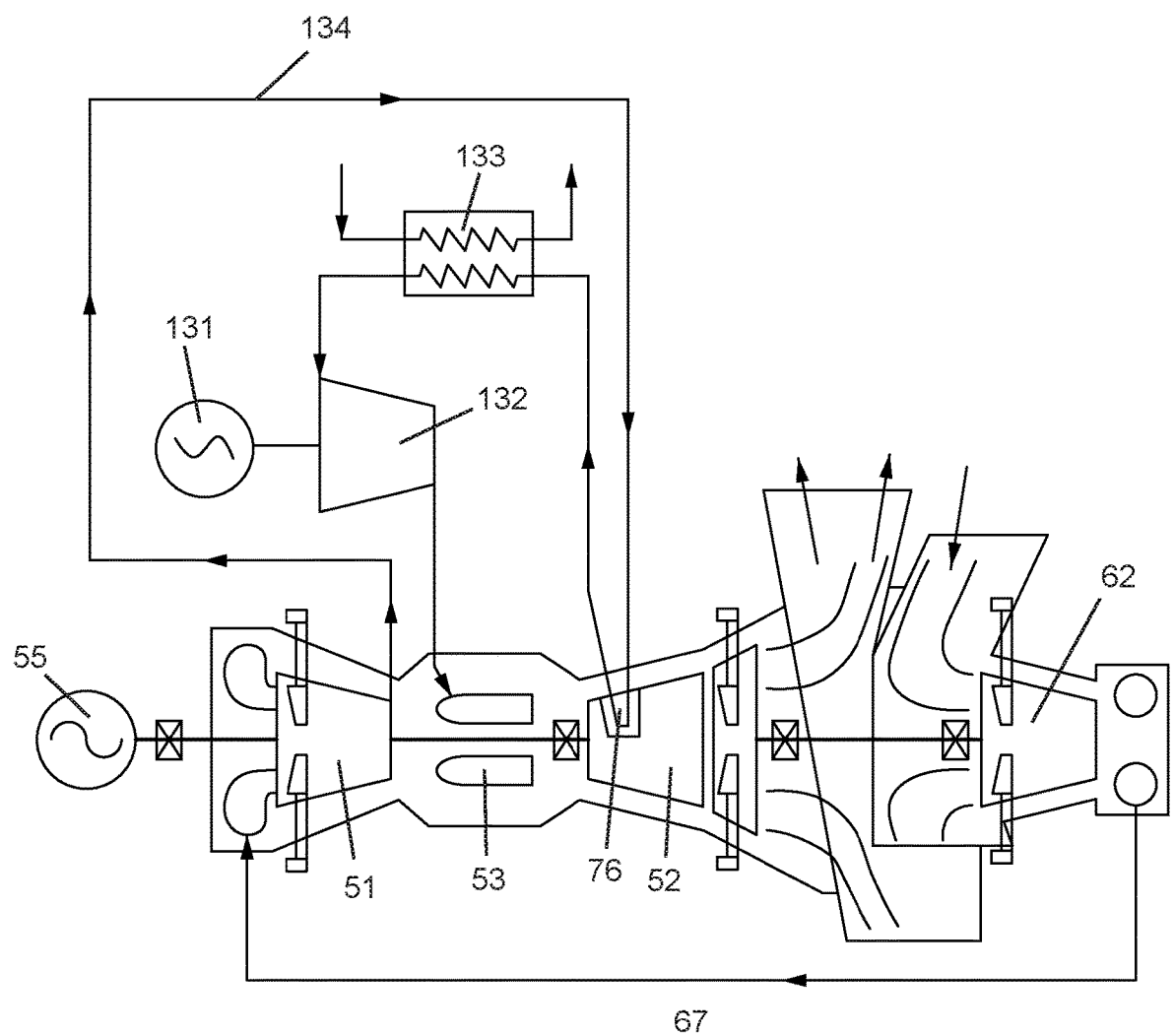
FIG. 25 shows an embodiment of the twin spool turbocharged industrial gas turbine engine of the present invention similar to the FIG. 24 embodiment, except that the cooling air is supplied from bleed air off from the high pressure compressor.

FIG. 25 shows another embodiment of the turbocharged industrial gas turbine engine similar to the FIG. 18 embodiment except that the cooling air for the turbine airfoil is bled off from the high pressure compressor 51 (instead of the low pressure compressor 62), then passed through cooling passage 134 and the turbine airfoil such as the row of stator vanes 76 to provide cooling, and then the spent cooling air is boosted in pressure by the cooling air compressor 132 driven by the motor 131 to the higher pressure required for discharge into the combustor 53. The spent cooling air from the turbine airfoil 76 is cooled using an intercooler 133 prior to entering the cooling air compressor 132. With the FIG. 19 embodiment, the seals within the cooling air passages can be lower pressure seals since the higher pressure occurs downstream from the cooled airfoils 76.

Figure 28:
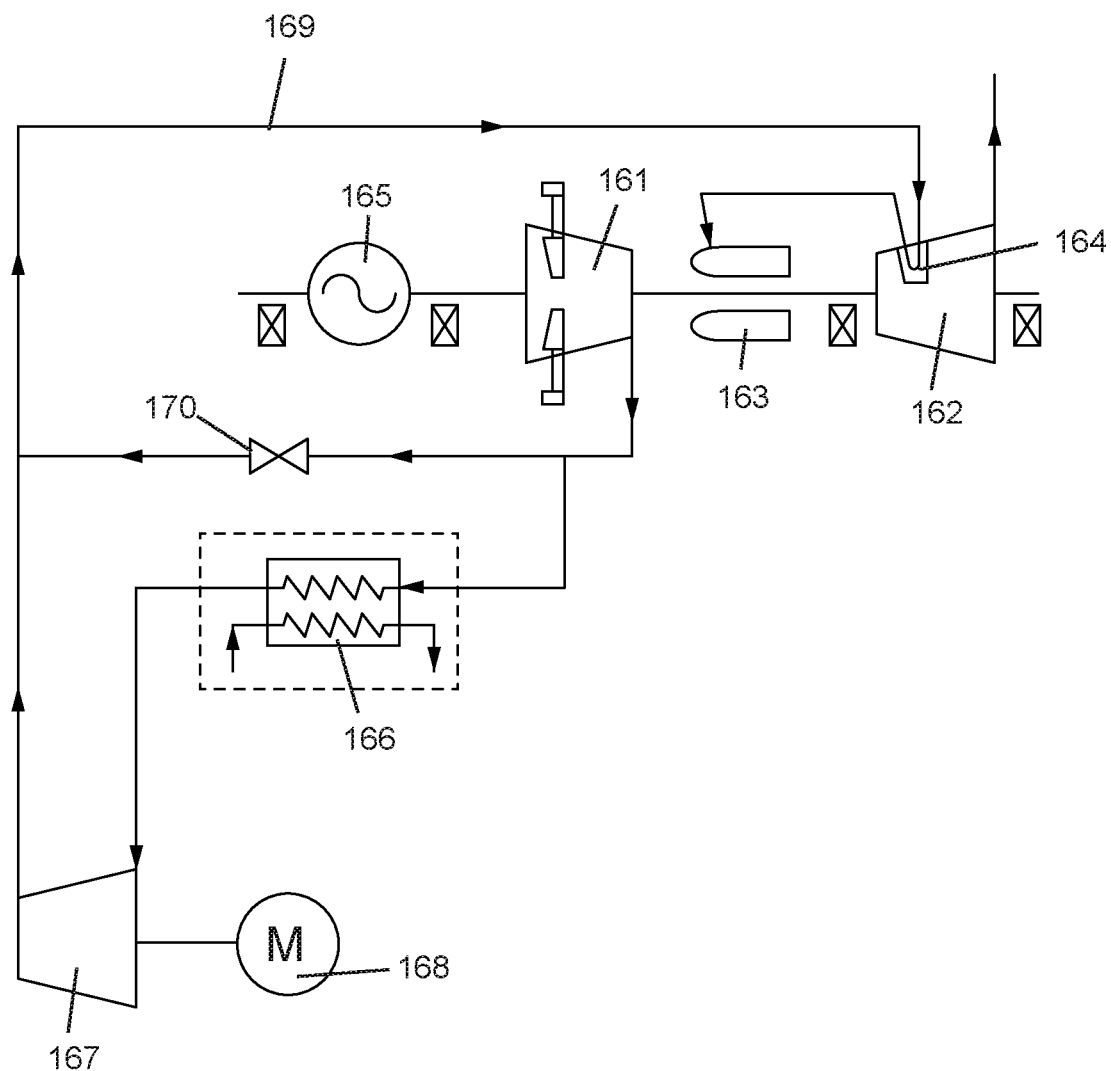
FIG. 28 shows a prior art single spool industrial gas turbine engine retrofitted with an airfoil cooling system of the present invention.

FIG. 28 shows an apparatus and a process of retrofitting and industrial gas turbine engine in which a turbine airfoil cooling system is added to the engine in order to increase an efficiency. The industrial gas turbine engine includes a compressor 161 driven by a turbine 162 with a combustor 163 that generates a hot gas stream to drive an electric generator 165 to produce electric power. Compressed air is bled off from the compressor 161 and passed through an intercooler 166 for cooling. The cooled compressed air is then passed through a fan or compressor 167 driven by a motor 168 to increase the pressure to a ratio of around 1.1 times that of the pressure discharged from the compressor 161. The compressed air from the fan 167 is then passed through cooling air line 169 and into an airfoil 164 cooling circuit to provide cooling, and where the spent cooling air is then discharged into the combustor 163 to be burned with fuel along with the compressor 161 discharge. In the event that the fan 167 does not work or at startup of the engine, a bypass line with a flow valve 170 is used to bypass the fan 167 and pass compressed air from the compressor 161 directly into the airfoil cooling circuit 164 of the turbine 162. The flow valve 170 has a normally open condition when a downstream pressure is not higher than the upstream pressure indicating that the fan 167 is not pressurizing the compressed air from the compressor 161 outlet. When the fan 167 is operating, the downstream pressure from the flow valve 170 will then be higher than the upstream pressure and the flow valve 170 will close so that all of the bleed off air from the compressor 161 will flow through the intercooler 166 and the fan 167 and into the airfoil 164 cooling circuit.

Figure 29:
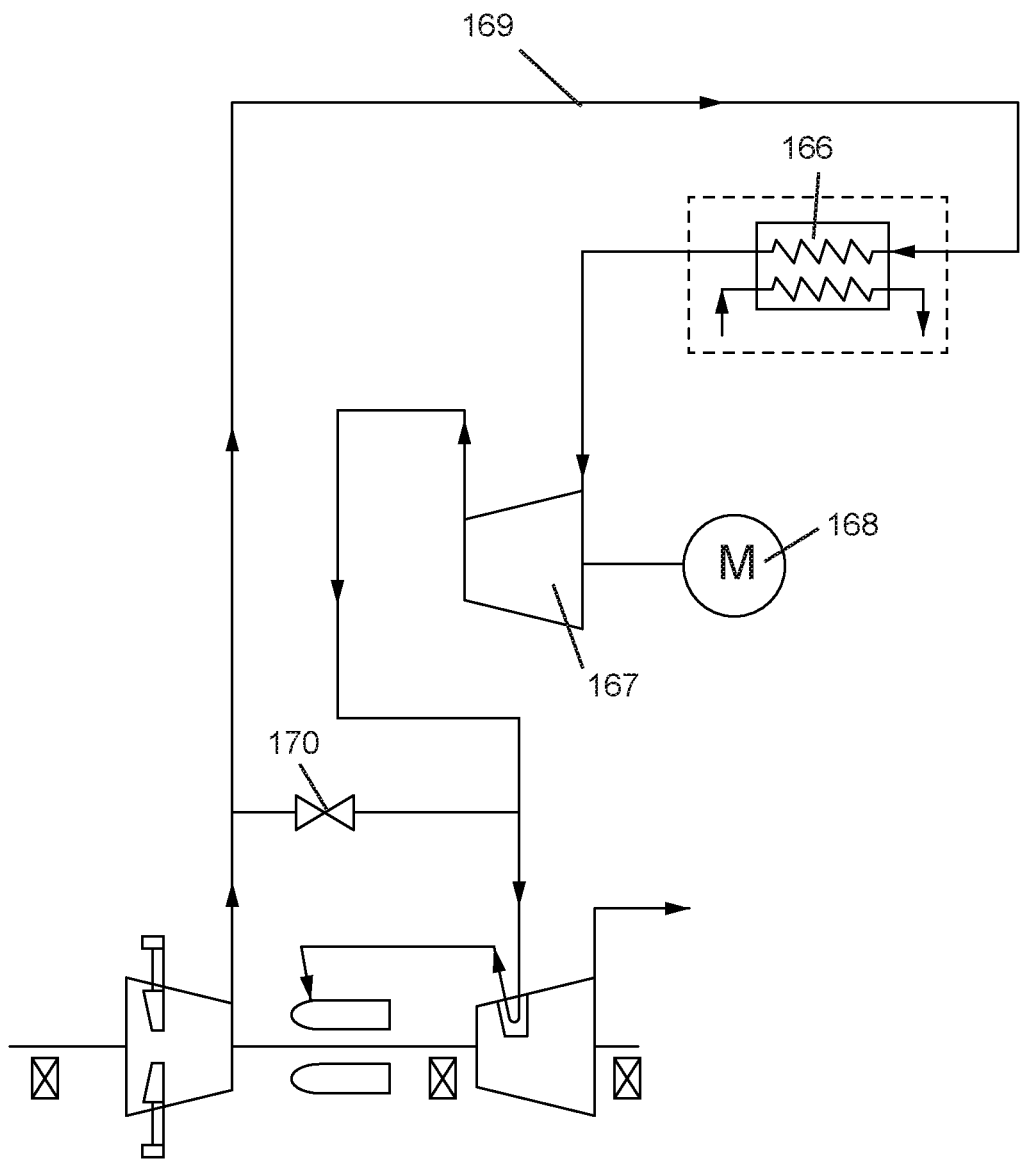
FIG. 29 shows a prior art aero gas turbine engine retrofitted with an airfoil cooling system of the present invention.

FIG. 29 shows an apparatus and a process for retrofitting an aero gas turbine engine similar to that shown in FIG. 28 for an industrial engine. Cooling air is bled off from the compressor and flows through the intercooler and fan to be compressed further to around a 1.1 pressure ratio compared to the compressor outlet, and then used to cool a turbine airfoil. The spent cooling air from the turbine airfoil is then discharged into the combustor to be burned with fuel.

Another process for retrofitting an older industrial gas turbine engine of the present invention is to add the closed loop cooling system to an older engine having an open loop cooling system. A typical prior art industrial gas turbine engine used for electric power production will have cooled turbine airfoils such as the first and second stages of rotor blades and stator vanes. Cooling air for these airfoils is taken from the compressor outlet and then passed through cooling circuits within the blades and vanes. Each of these airfoils has many rows of film cooling holes that will discharge the spent cooling air into the hot gas stream passing through the turbine. Thus, the work down by the compressor to pressurize the cooling air is lost in the engine. The stator vanes can use up to 15% of the total compressor discharge just to provide cooling to these airfoils. Also, because of hot streaks formed within the turbine, some vanes are overcooled because each vane is designed to receive the same amount of cooling air flow. The reason for this is to make sure that the stator vanes exposed to the hot streak is adequately cooled. Thus, the open loop cooling design of the prior art engine wastes a lot of energy in the cooling of the stator vanes with cooling air discharge to the hot gas stream.

In the retrofitting of the IGT engine according to the present invention, the rotor blades are left in and cooled according to the original system. However, the stator vanes are replaced with new vanes having impingement cooling inserts in which the cooling air flows into the vanes, impinges on selected surfaces within the vanes, and then flows out of the vanes without being discharged into the hot gas stream of the turbine. Some of the cooling air can be discharged into the hot gas stream such as around the trailing edge section of the vanes because a closed loop cooling circuit would be difficult to form in these thin airfoil walls. Thus, the first and even the second stage stator vanes are replaced with closed loop cooling circuits. Cooling air for the stator vanes is taken from the compressor discharge and passed through an intercooler to cool the compressed air. The cooled compressed air is then boosted in pressure using a cooling air compressor or fan that will increase the pressure to around 1.1 times that of the main compressor discharge so that the cooling air can pass through the stator vanes closed loop cooling circuit and still have enough pressure to be discharged into the combustor. Thus, the stator vanes are cooled with cooling air that is heated and then discharged into the combustor instead of being discharged into the hot gas stream of the turbine where the energy of compression is wasted.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A process for retrofitting a combined cycle electric power plant, the combined cycle electric power plant having a first large frame heavy duty industrial gas turbine engine driving a first electric generator and a second large frame heavy duty industrial gas turbine engine driving a second electric generator, the combined cycle electric power plant also having a heat recovery steam generator with a third electric generator, the process comprising the steps of:
removing the first large frame heavy duty industrial gas turbine engine from the combined cycle electric power plant;
removing the second large frame heavy duty industrial gas turbine engine from the combined cycle electric power plant;
installing a third large frame heavy duty industrial gas turbine engine in the combined cycle electric power plant to replace the first and second large frame heavy duty industrial gas turbine engines, the third large frame heavy duty industrial gas turbine engine having:
a high spool with a high pressure compressor driven by a high pressure gas turbine and a combustor; and
a low spool with a low pressure compressor and a low pressure turbine, the low spool being rotatable and not within the high spool; and
a power output of the third large frame heavy duty industrial gas turbine engine being greater than or equal to a combined power output of the first and second large frame heavy duty industrial gas turbine engines, and a turbine exhaust temperature of the third large frame heavy duty industrial gas turbine engine being substantially the same as a turbine exhaust temperature of each of the first and second large frame heavy duty industrial gas turbine engines such that the heat recovery steam generator does not require modification.

2. The process for retrofitting a combined cycle electric power plant of claim 1, wherein:

the combined cycle electric power plant is a 60 Hertz power plant; and the third large frame heavy duty industrial gas turbine engine has a power output of at least 500 MW.

3. The process for retrofitting a combined cycle electric power plant of claim 1, wherein:

the combined cycle electric power plant is a 50 Hertz power plant; and the third large frame heavy duty industrial gas turbine engine has a power output of at least 750 MW.

4. The process for retrofitting a combined cycle electric power plant of claim 1, wherein:

the first and second large frame heavy duty industrial gas turbine engines each have a power output of less than 350 MW for a 60 Hertz power plant.

5. The process for retrofitting a combined cycle electric power plant of claim 1, wherein:

the first and second large frame heavy duty industrial gas turbine engines each have a power output of less than 500 MW for a 50 Hertz power plant.

6. The process for retrofitting a combined cycle electric power plant of claim 1, further comprising the steps of:

removing the first and second electric generators; and installing a fourth electric generator driven by the third large frame heavy duty industrial gas turbine engine.

7. The process for retrofitting a combined cycle electric power plant of claim 1, wherein each of the first and second large frame heavy duty industrial gas turbine engines is one of a 60 hertz system and a 50 hertz system, and:

the first large frame heavy duty industrial gas turbine engines has a power output of at least 250 MW when the first large frame heavy duty industrial gas turbine engine is a 60 hertz system and has a power output of at least 375 MW when the first large frame heavy duty industrial gas turbine engine is a 50 hertz system; and the second large frame heavy duty industrial gas turbine engines has a power output of at least 250 MW when the second large frame heavy duty industrial gas turbine engine is a 60 hertz system and has a power output of at least 375 MW when the second large frame heavy duty industrial gas turbine engine is a 50 hertz system.

* * * * *